United States Patent
Takizawa

(10) Patent No.: US 11,635,776 B2
(45) Date of Patent: *Apr. 25, 2023

(54) UNMANNED AERIAL VEHICLE CONTROL SYSTEM, UNMANNED AERIAL VEHICLE CONTROL METHOD, AND PROGRAM

(71) Applicant: RAKUTEN GROUP, INC., Tokyo (JP)

(72) Inventor: Jun Takizawa, Chino (JP)

(73) Assignee: RAKUTEN GROUP, INC., Tokyo (JP)

( * ) Notice: Subject to any disclaimer, the term of this patent is extended or adjusted under 35 U.S.C. 154(b) by 242 days.

This patent is subject to a terminal disclaimer.

(21) Appl. No.: 17/129,731

(22) Filed: Dec. 21, 2020

(65) Prior Publication Data

US 2021/0109551 A1 Apr. 15, 2021

Related U.S. Application Data

(63) Continuation of application No. 16/309,102, filed as application No. PCT/JP2016/068178 on Jun. 17, 2016, now Pat. No. 10,908,621.

(51) Int. Cl.
  *G05D 1/10* (2006.01)
  *B64D 45/00* (2006.01)
  *B64C 39/02* (2023.01)
  *B64C 13/20* (2006.01)
  (Continued)

(52) U.S. Cl.
  CPC .............. *G05D 1/106* (2019.05); *B64C 13/20* (2013.01); *B64C 39/02* (2013.01); *B64C 39/024* (2013.01);
  (Continued)

(58) Field of Classification Search
  CPC ........ G05D 1/106; B64C 13/20; B64C 39/02; B64C 39/024; B64C 2201/027;
  (Continued)

(56) References Cited

U.S. PATENT DOCUMENTS 10,908,621 B2 * 2/2021 Takizawa ............... B64D 45/00
2008/0255711 A1 * 10/2008 Matos .................. G08G 5/0069
701/2

(Continued)

FOREIGN PATENT DOCUMENTS

JP 2005339175 A 12/2005
JP 2007099237 A 4/2007
(Continued)

OTHER PUBLICATIONS

Office Action dated Jun. 8, 2021, for corresponding JP Patent Application No. 2020-117878 with partial English translation pp. 1-4.

(Continued)

*Primary Examiner* — Richard M Camby
(74) *Attorney, Agent, or Firm* — HEA Law PLLC

(57) ABSTRACT

An unmanned aerial vehicle is caused to fly by avoiding a no-fly zone, which changes as a moving object moves. Provided is an unmanned aerial vehicle control system, including: moving object position acquisition means for acquiring moving object position information on a current position of a moving object moving above a surface of an earth; zone setting means for setting a no-fly zone in which a flight of an unmanned aerial vehicle is inhibited based on the moving object position information; and flight control means for controlling the flight of the unmanned aerial vehicle so that the unmanned aerial vehicle avoids the no-fly zone set based on the moving object position information.

18 Claims, 18 Drawing Sheets

(51) Int. Cl.
*G08G 5/00* (2006.01)
*B64U 10/13* (2023.01)
*B64U 101/60* (2023.01)

(52) U.S. Cl.
CPC ............... *B64D 45/00* (2013.01); *G08G 5/00*
(2013.01); *B64U 10/13* (2023.01); *B64U*
*2101/60* (2023.01)

(58) Field of Classification Search
CPC ........ B64C 2201/128; B64C 2201/141; B64C
2201/145; B64D 45/00; G08G 5/00
See application file for complete search history.

(56) References Cited

U.S. PATENT DOCUMENTS

| | | | |
|---|---|---|---|
| 2012/0022719 A1* | 1/2012 | Matos | G08G 5/0052 |
| | | | 701/2 |
| 2012/0158219 A1 | 6/2012 | Durling et al. | |
| 2014/0025230 A1* | 1/2014 | Levien | G05D 1/102 |
| | | | 701/2 |
| 2016/0070265 A1 | 3/2016 | Liu et al. | |
| 2020/0142410 A1 | 5/2020 | Liu et al. | |

FOREIGN PATENT DOCUMENTS

| | | |
|---|---|---|
| JP | 2012131484 A | 7/2012 |
| WO | 2016024314 A1 | 2/2016 |
| WO | 2016033797 A1 | 3/2016 |

OTHER PUBLICATIONS

Office Action dated Nov. 9, 2021, for corresponding JP Patent Application No. 2020-117878 with partial English translation pp. 1-6.

* cited by examiner

FIG.7

| CURRENT HOLE IN PLAY | PICKUP POINT |
|---|---|
| 1ST HOLE | 5TH HOLE |
| 2ND HOLE | 6TH HOLE |
| 3RD HOLE | 7TH HOLE |
| 4TH HOLE | 8TH HOLE |
| 5TH HOLE-7TH HOLE | 9TH HOLE |
| 8TH HOLE-9TH HOLE | ORDER UNAVAILABLE |

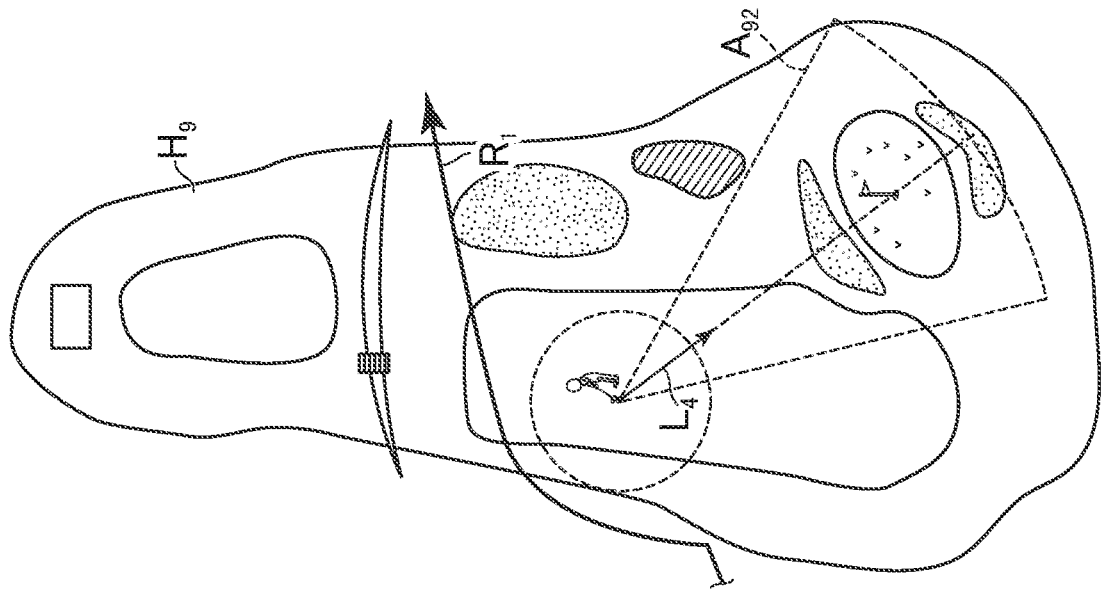
FIG.12
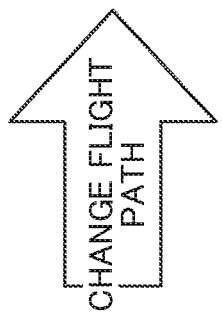
CHANGE FLIGHT PATH
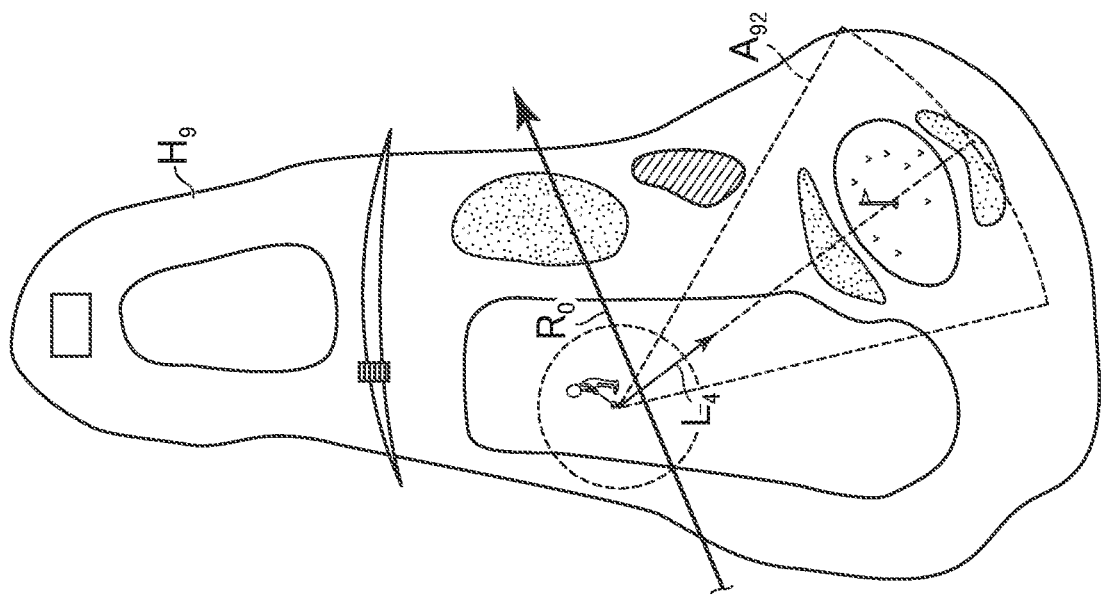

UNMANNED AERIAL VEHICLE CONTROL SYSTEM, UNMANNED AERIAL VEHICLE CONTROL METHOD, AND PROGRAM

CROSS-REFERENCE TO RELATED APPLICATIONS

This application claims priority to and is a continuation of U.S. application Ser. No. 16/309,102 filed on Dec. 11, 2018, which is a National Stage of International Application No. PCT/JP2016/068178 filed on Jun. 17, 2016. The contents of the above documents are incorporated herein by reference in its entirety.

TECHNICAL FIELD

The present invention relates to an unmanned aerial vehicle control system, an unmanned aerial vehicle control method, and a program.

BACKGROUND ART

Hitherto, there is known a technology of flying an unmanned aerial vehicle so that the unmanned aerial vehicle avoids a no-fly zone in which flight of an aerial vehicle is inhibited. For example, in Patent Literature 1, there is described a technology of setting a no-fly zone based on positions of fixed structures fixed to the ground such as power pylons and power-transmission lines so that the unmanned aerial vehicle avoids a contact of an unmanned aerial vehicle with the fixed structures.

CITATION LIST

Patent Literature

[PTL 1] JP 2003-127994 A

SUMMARY OF INVENTION

Technical Problem

There are not only fixed structures but also moving bodies such as humans and trains on the ground. When the moving object moves, a no-fly zone corresponding to the moving object changes. However, in order to set the no-fly zones of Patent Literature 1, only the fixed structures fixed to the ground are considered, and thus, the unmanned aerial vehicle may become an obstacle to the moving object or the moving object may become an obstacle to the unmanned aerial vehicle.

The present invention has been made in view of the above-mentioned problem, and therefore has an object to enable an unmanned aerial vehicle to fly by avoiding a no-fly zone, which changes as a moving object moves.

Solution to Problem

In order to solve the above-mentioned problem, according to one embodiment of the present invention, there is provided an unmanned aerial vehicle control system including: moving object position acquisition means for acquiring moving object position information on a current position of a moving object moving above a surface of an earth; zone setting means for setting a no-fly zone in which a flight of the unmanned aerial vehicle is inhibited based on the moving object position information; and flight control means for controlling the flight of the unmanned aerial vehicle so that the unmanned aerial vehicle avoids the no-fly zone set based on the moving object position information.

According to one embodiment of the present invention, there is provided an unmanned aerial vehicle control method including: moving object position acquisition step of acquiring moving object position information on a current position of a moving object moving above a surface of an earth; zone setting step of setting a no-fly zone in which a flight of the unmanned aerial vehicle is inhibited based on the moving object position information; and flight control step of controlling the flight of the unmanned aerial vehicle so that the unmanned aerial vehicle avoids the no-fly zone set based on the moving object position information.

According to one embodiment of the present invention, there is provided a program for causing a computer to function as: moving object position acquisition means for acquiring moving object position information on a current position of a moving object moving above a surface of an earth; zone setting means for setting a no-fly zone in which a flight of the unmanned aerial vehicle is inhibited based on the moving object position information; and flight control means for controlling the flight of the unmanned aerial vehicle so that the unmanned aerial vehicle avoids the no-fly zone set based on the moving object position information.

Further, an information storage medium according to one embodiment of the present invention is a computer-readable information storage medium having the above-mentioned program stored thereon.

Further, in one aspect of the present invention, the unmanned aerial vehicle control system further includes: unmanned aerial vehicle position acquisition means for acquiring unmanned aerial vehicle position information on a current position of the unmanned aerial vehicle; and destination acquisition means for acquiring destination information on a destination of the unmanned aerial vehicle. The flight control means is configured to control the flight of the unmanned aerial vehicle so that the unmanned aerial vehicle arrives at the destination from the current position of the unmanned aerial vehicle by avoiding the no-flight zone based on the unmanned aerial vehicle position information and the destination information.

Further, in one aspect of the present invention, the zone setting means is configured to determine at least one of a size or a shape of the no-fly zone based on the moving object position information.

Further, in one aspect of the present invention, the unmanned aerial vehicle control system further includes state acquisition means for acquiring moving object state information on a current state of the moving object. The zone setting means is configured to set the no-fly zone based on the moving object state information.

Further, in one aspect of the present invention, the moving object state information is information on a current movement state of the moving object, and wherein the zone setting means is configured to set the no-fly zone based on the current movement state indicated by the moving object state information.

Further, in one aspect of the present invention, the unmanned aerial vehicle control system further includes property acquisition means for acquiring moving object property information on a property of the moving object. The zone setting means is configured to set the no-fly zone based on the moving object property information.

Further, in one aspect of the present invention, the unmanned aerial vehicle control system further includes movement estimation means configured to estimate a movement of the moving object from the current position based on the moving object position information, the zone setting means configured to set the no-fly zone based on an estimation result obtained by the movement estimation means.

Further, in one aspect of the present invention, the movement estimation means is configured to chronologically estimate the movement of the moving object. The zone setting means is configured to set the no-fly zone for each time point estimated by the movement estimation means, and the flight control means is configured to carryout flight control for the unmanned aerial vehicle based on a chronological change in the no-fly zone.

Further, in one aspect of the present invention, the unmanned aerial vehicle control system further includes information acquisition means for acquiring time information on an arrival time and distance information on a movement distance at a time when the unmanned aerial vehicle flies to the destination by avoiding the no-fly zone. The flight control means is configured to carry out the flight control for the unmanned aerial vehicle based on the time information and the distance information.

Further, in one aspect of the present invention, the unmanned aerial vehicle control system further includes specification reception means for receiving a specification relating to whether priority is to be given to the arrival time or the movement distance. The flight control means is configured to carry out the flight control for the unmanned aerial vehicle based on a specification result received by the specification reception means.

Further, in one aspect of the present invention, the flight control means is configured to cause the unmanned aerial vehicle to wait so that the flight of the unmanned aerial vehicle is controlled to avoid the no-fly zone.

Further, in one aspect of the present invention, the moving object is a player or a golf cart moving in a golf course. The moving object position acquisition means is configured to acquire the moving object position information indicating a current position of the player or the golf cart based on a detection signal of a GPS sensor of a player terminal or a golf cart terminal. The zone setting means is configured to set the no-fly zone based on the current position of the player or the golf cart. The flight control means is configured to control the flight of the unmanned aerial vehicle carrying a package to be transported to a predetermined position in the golf course so that the unmanned aerial vehicle avoids the no-fly zone set based on the current position of the player or the golf cart.

Advantageous Effects of Invention

According to the embodiments of the present invention, it is possible to enable the unmanned aerial vehicle to fly by avoiding the no-fly zone, which changes as the moving object moves.

BRIEF DESCRIPTION OF DRAWINGS

FIG. 7 is a table for showing an example of pickup point data.

FIG. 12 is a diagram for illustrating a flight path that avoids the no-fly zone.

DESCRIPTION OF EMBODIMENTS

1. Overall Configuration of Unmanned Aerial Vehicle Control System

Description is now made of an example of an unmanned aerial vehicle control system according to an embodiment of the present invention. In this embodiment, description is made of processing relating to the unmanned aerial vehicle control system taking a case in which an unmanned aerial vehicle delivers articles ordered by a player during a round in a golf course as an example.

Figure 1:
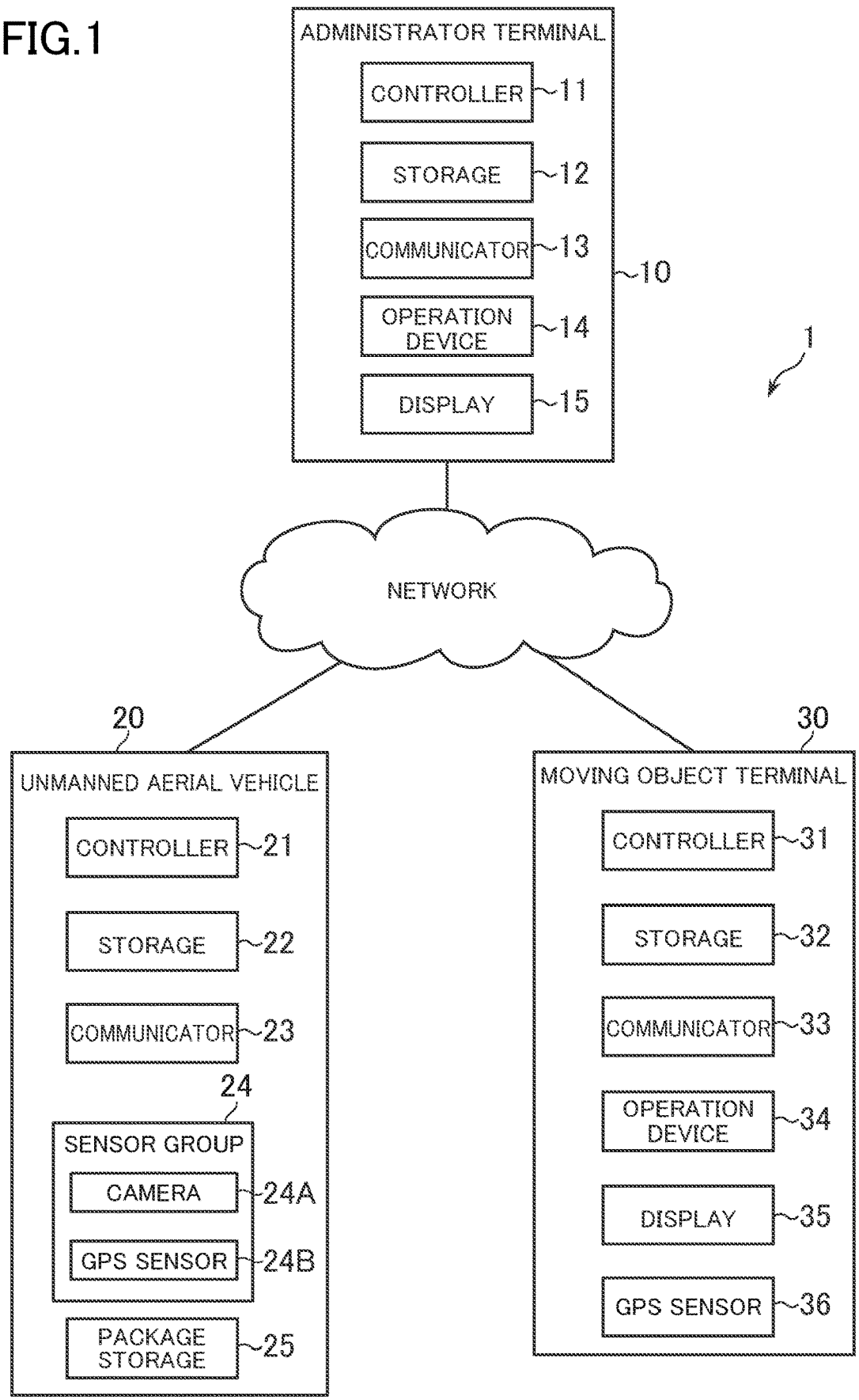
FIG. 1 is a diagram for illustrating an overall configuration of an unmanned aerial vehicle control system.

FIG. 1 is a diagram for illustrating an overall configuration of the unmanned aerial vehicle control system. As illustrated in FIG. 1, the unmanned aerial vehicle control system 1 includes an administrator terminal 10, an unmanned aerial vehicle 20, and a moving object terminal 30. The administrator terminal 10, the unmanned aerial vehicle 20, and the moving object terminal 30 are connected to one another so as to enable transmission/reception of data via a network. In FIG. 1, although the number of each of the administrator terminal 10, the unmanned aerial vehicle 20, and the moving object terminal 30 is one, the number may be two or more.

The administrator terminal 10 is a computer operated by an administrator, and is, for example, a personal computer, a server computer, or a portable terminal (including a tablet terminal and a smartphone). The administrator is a person who administrates the unmanned aerial vehicle control system 1, and is, for example, a person in charge of providing the delivery service of articles in the golf course. For example, the administrator terminal 10 may be configured to be operated by the administrator in a club house or a vicinity thereof in the golf course. The administrator terminal 10 includes a controller 11, a storage 12, a communicator 13, an operation device 14, and a display 15.

The controller 11 includes, for example, at least one microprocessor. The controller 11 executes processing in accordance with programs and data stored in the storage 12. The storage 12 includes a main memory and an auxiliary memory. For example, the main memory is a volatile memory, for example, a RAM, and the auxiliary memory is a non-volatile memory such as a hard disk drive or a flash memory. The communicator 13 includes a communication interface for wired communication or wireless communication. The communicator 13 performs data communication via the network. The operation device 14 is an input device, and is, for example, a pointing device such as a touch panel and a mouse, or a keyboard. The operation device 14 is configured to transmit details of operation to the controller 11. The display 15 is, for example, a liquid crystal display or an organic EL display. The display 15 is configured to display a screen in accordance with an instruction of the controller 11.

The unmanned aerial vehicle 20 is an aerial vehicle that does not accommodate a person, and is, for example, an unmanned aerial vehicle (so-called drone) driven by a battery or an unmanned aerial vehicle driven by an engine. In this embodiment, it is assumed that the unmanned aerial vehicle 20 has a takeoff and landing point near the club house, and is under administration of the administrator. The unmanned aerial vehicle 20 includes a controller 21, a storage 22, a communicator 23, a sensor group 24, and a package storage 25. Hardware configurations of the controller 21, the storage 22, and the communicator 23 are the same as those of the controller 11, the storage 12, and the communicator 13, respectively, and thus a description thereof is omitted. Moreover, the unmanned aerial vehicle 20 also includes general physical components such as propellers, motors, and a battery, but those components are not described herein.

The sensor group 24 includes a camera 24A and a GPS sensor 24B. The camera 24A include an image pickup element such as a CCD image sensor or a CMOS image sensor, and records an image (still image or moving image) photographed by the image pickup element as digital data. The GPS sensor 24B includes a receiver configured to receive signals from satellites, and detects positional information based on the signals received by the receiver. Any sensor may be mounted on the unmanned aerial vehicle 20, and the sensor group 24 may include, for example, an infrared sensor, a sound sensor (microphone), an anemometer, an acceleration sensor, a gyro sensor, a geomagnetic sensor, an altitude sensor, a displacement sensor, a temperature sensor, or a heat detection sensor.

Figure 2:
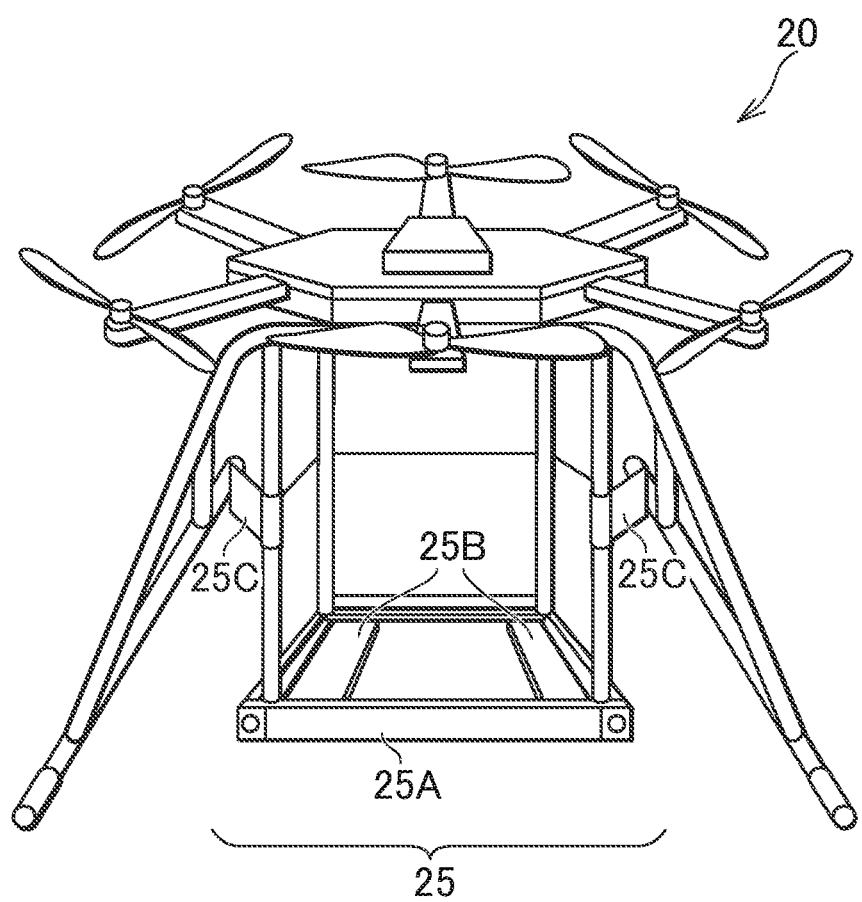
FIG. 2 is a diagram for illustrating a package storage, and an exterior view for illustrating an unmanned aerial vehicle.

The package storage 25 includes fixing members configured to fix a package to the unmanned aerial vehicle 20. FIG. 2 is a diagram for illustrating the package storage 25, and is an exterior view for illustrating the unmanned aerial vehicle 20. As illustrated in FIG. 2, for example, the package storage 25 includes a frame 25A having a space for storing a package. For example, when articles ordered by the player are packed in a box, and are transported, the frame 25A has such a size that the box can be loaded and fixed inside.

Moreover, the package storage 25 includes arms 25B configured to support the package during transportation so as to prevent the package from dropping and fixing members 25C including publicly-known lock mechanisms. The administrator places the package on the arms 25B, and then closes the fixing members 25C so as to prevent the package from horizontally moving. The arms 25B are configured to be capable of opening/closing through a rotation of a motor, which is not shown. When the unmanned aerial vehicle 20 lands at a predetermined pickup point, the arms 25B open downward, and the package placed on the arms 25B falls down by some centimeters, and can be placed on the ground.

The package storage 25 is only required to have a space for storing and fixing the package, and is not limited to the above-mentioned example. For example, the package storage 25 may include arms for sandwiching a package in the horizontal direction and the vertical direction for fixing, or may include magnets for fixing a package through magnetic force. Moreover, for example, the package storage 25 may include a storage container, a net, or a bag for storing a package.

The moving object terminal 30 is a computer moving along with a moving object, and is, for example, a personal computer, or a portable terminal (including a tablet terminal and a smartphone). The moving object is an object moving on the ground, and is, for example, an animal such as a human, an automobile, a motorbike, or a train. In other words, the moving object is a subject of setting a no-fly zone. In this embodiment, description is made of a case in which the player moving in the golf course is the moving object. The moving object terminal 30 is a portable terminal, and, for example, is stored in a pocket of clothes worn by the player.

The moving object terminal 30 includes a controller 31, a storage 32, a communicator 33, the operation device 34, a display 35, and a GPS sensor 36. Those hardware configurations are similar to those of the controller 11, the storage 12, the communicator 13, the operation device 14, the display 15, and the GPS sensor 24B, and thus a description thereof is omitted here.

Programs and data to be described as being stored into the storages 12, 22, and 23 may be supplied thereto via a network. Further, the hardware configurations of the administrator terminal 10, the unmanned aerial vehicle 20, and the moving object terminal 30 are not limited to the above-mentioned examples, and various pieces of computer hardware can be applied. For example, each of the administrator terminal 10, the unmanned aerial vehicle 20, and the moving object terminal 30 may include a reader (e.g., optical disc drive or memory card slot) configured to read a computer-readable information storage medium. In this case, programs and data stored in the computer-readable information storage medium may be supplied to each computer via the reader.

2. Overview of Processing by Unmanned Aerial Vehicle Control System

Figure 3:
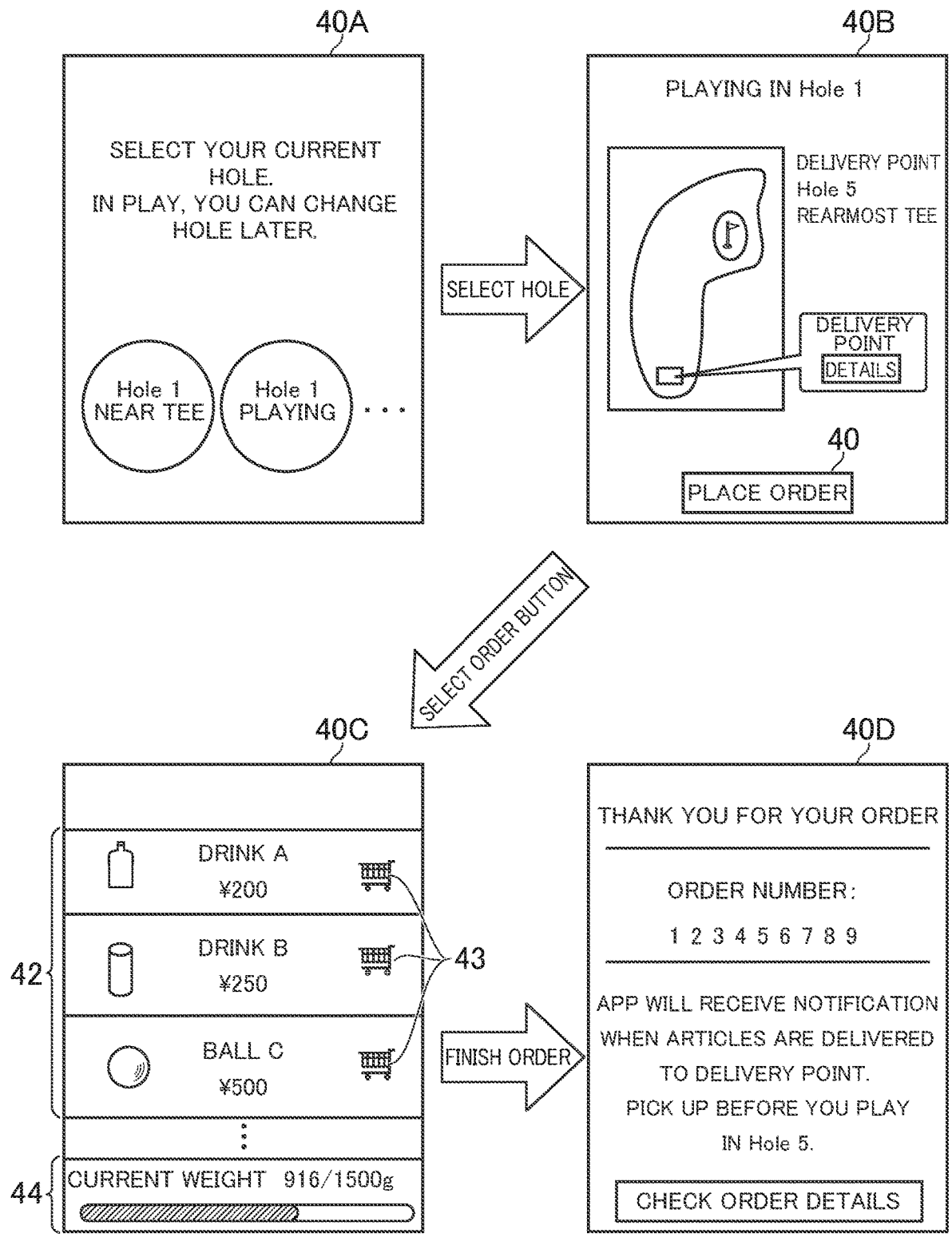
FIG. 3 is a diagram for illustrating how a player orders articles.
Figure 4:
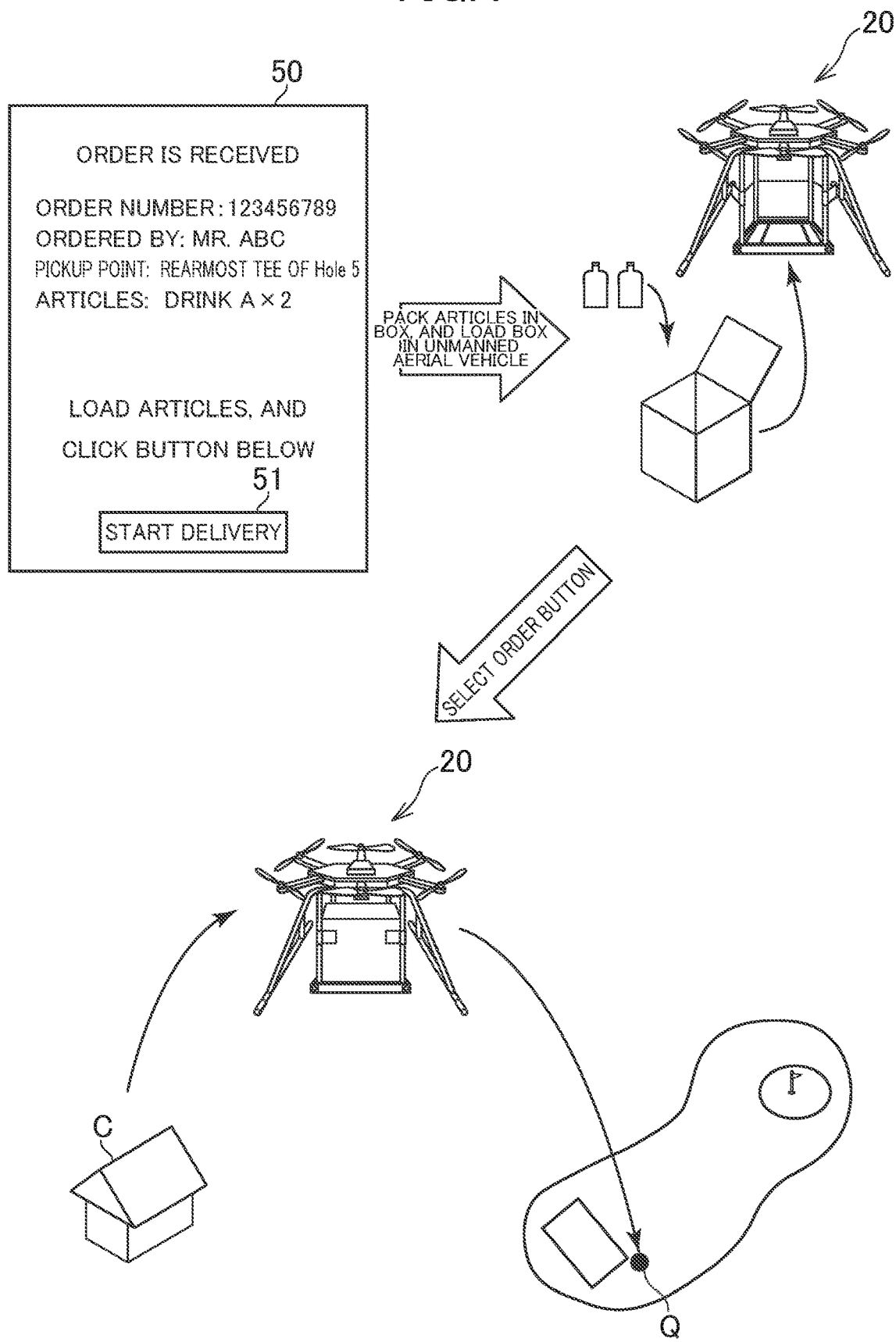
FIG. 4 is a diagram for illustrating how the articles ordered by the player are delivered.

Referring to FIG. 3 and FIG. 4, description is made of an overview of processing by the unmanned aerial vehicle control system 1. FIG. 3 is a diagram for illustrating how the player orders articles. FIG. 4 is a diagram for illustrating how the articles ordered by the player are delivered.

As illustrated in FIG. 3, when the player operates the operation device 34 to activate a dedicated application, or to connect from a web browser to a predetermined web site, an order screen 40A for selecting a hole in which the player is playing is displayed on the display 35. When the player selects the hole in which the player is playing from the order screen 40A, an order screen 40B for displaying a pickup point of the articles is displayed. The pickup point of the articles is set to, for example, a predetermined location in a hole subsequent to the hole in which the player is playing.

When the player selects an order button 41 on the order screen 40B, an order screen 40C displaying a list 42 of articles is displayed. When the player selects an icon 43 in the list 42, the player can add the article in a shopping cart. An upper limit value is set to a total weight of articles that the unmanned aerial vehicle 20 can transport. A relationship 44 between the total weight of articles added to the shopping cart and the upper limit value is displayed on the order screen 40C. When the player carries out a predetermined operation of ordering the articles added to the shopping cart, the details of the order are transmitted from the moving object terminal 30 to the administrator terminal 10, and a message indicating completion of the order is displayed on the order screen 40D.

When the administrator terminal 10 receives the details of the order content from the movable body terminal 30, an order reception screen 50 illustrated in FIG. 4 is displayed on the display 15. The administrator checks the details of the order from the order reception screen 50, pack the articles in a dedicated box, loads the box inside the frame 25A of the package storage 25, and closes and locks the fixing members 25C. When the administrator operates the operation device 14 to select a delivery start button 51, a delivery instruction for the articles is transmitted from the administrator terminal 10 to the unmanned aerial vehicle 20. In this embodiment, it is assumed that a shortest flight path from the club house C to the pickup point Q is contained in the delivery instruction. The flight path may indicate not only passage points of the flight, but also a flight plan containing passage time points at the respective passage points. The unmanned aerial vehicle 20 starts the flight based on the flight path contained in the delivery instruction.

The administrator terminal 10 is configured to receive current positions of the unmanned aerial vehicle 20 and the moving object terminals 30 during the flight of the unmanned aerial vehicle 20, and adjust the flight path so that the unmanned aerial vehicle 20 does not fly near respective players during the round and near estimated trajectories of shots. When the flight path is required to be changed, the administrator terminal 10 transmits a new flight path to the unmanned aerial vehicle 20. The unmanned aerial vehicle 20 changes the flight path based on the received new flight path. In such a manner, the unmanned aerial vehicle control system 1 is configured to adjust the flight path from the start of the unmanned aerial vehicle 20 for the delivery of articles to a return to the club house C after the delivery of the articles so that the unmanned aerial vehicle avoids the vicinities of the players and the vicinities of the estimated trajectories of shots. Detailed description is now made of this technology.

3. Functions Implemented in Unmanned Aerial Vehicle Control System

Figure 5:
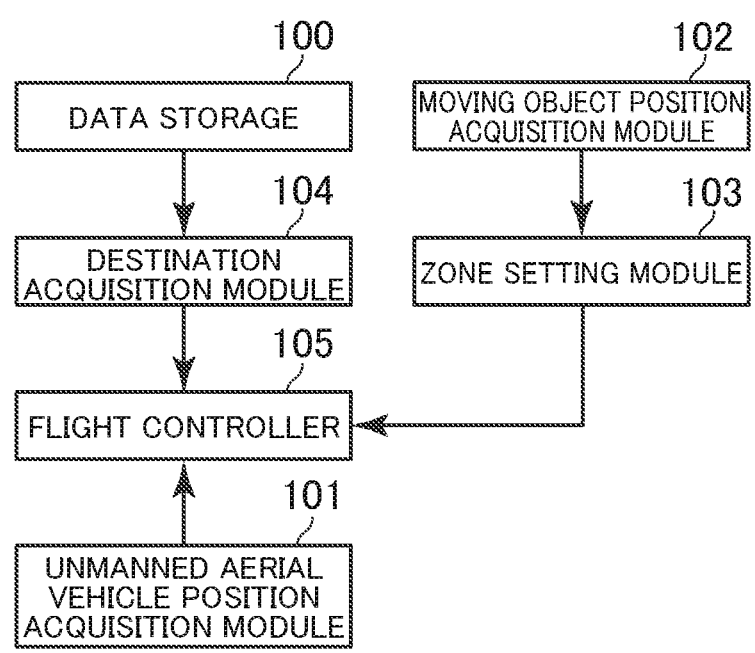
FIG. 5 is a functional block diagram for illustrating an example of functions implemented in the unmanned aerial vehicle control system.

FIG. 5 is a functional block diagram for illustrating an example of functions implemented in the unmanned aerial vehicle control system 1. As illustrated in FIG. 5, in the unmanned aerial vehicle control system 1, a data storage 100, an unmanned aerial vehicle position acquisition module 101, a moving object position acquisition module 102, a zone setting module 103, a destination acquisition module 104, and a flight controller 105 are implemented. In this embodiment, description is made of a case in which those respective functions are implemented in the administrator terminal 10.

[3-1. Data Storage]

The storage 12 mainly implements the data storage 100. The data storage 100 is configured to store data used to determine the flight path of the unmanned aerial vehicle 20. In the following, description is made of map data on a region in which the unmanned aerial vehicle 20 flies and pickup point data indicating pickup points, which are examples of destinations of the unmanned aerial vehicle 20 as data stored in the data storage 100.

Figure 6:
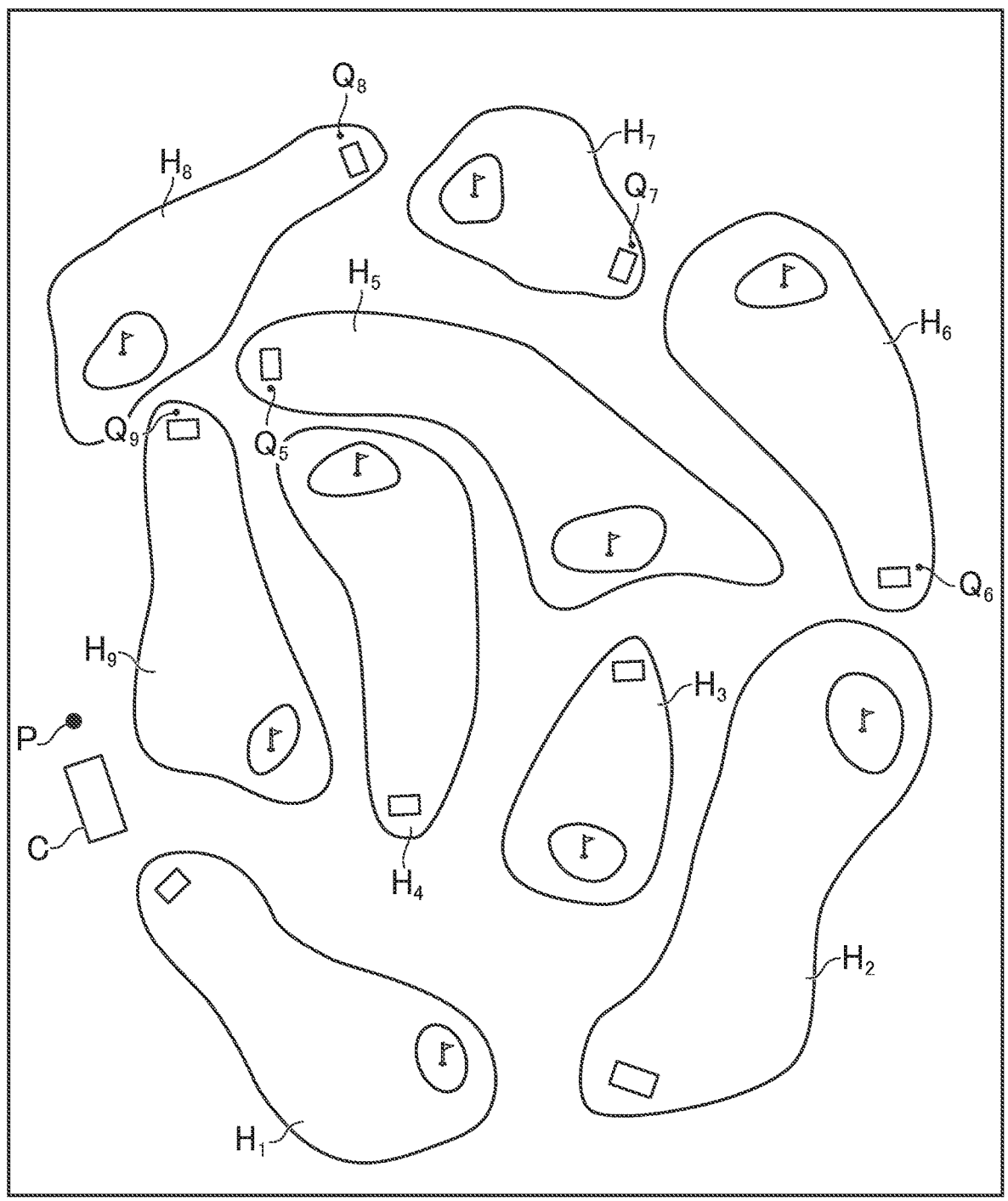
FIG. 6 is a diagram for illustrating an example of map data.

FIG. 6 is a diagram for illustrating an example of the map data. In this embodiment, the unmanned aerial vehicle 20 flies over the golf course, and, as illustrated in FIG. 6, the map data may be a hole map indicating a layout of respective holes. A map indicated by the map data may be a two-dimensional map only formed of two-dimensional information or a three-dimensional map also containing information on height. The map data of FIG. 6 indicates a layout of respective golf holes including a first hole $H_1$ to a ninth hole $H_9$. For example, the map data contains latitude/longitude information on respective positions on the map. In other words, the map data contains latitude/longitude information on a region illustrated in the map. The latitude/longitude information is information specifying a position in the north/south direction and a position in the east/west direction on the earth, and is, for example, represented as respective numerical values in degree, minute, and second.

A freely-selected position in the map indicated by the map data is registered in advance to the data storage 100 as the takeoff and landing point of the unmanned aerial vehicle 20. In this embodiment, the takeoff and landing point of the unmanned aerial vehicle 20 is in the vicinity of the club house C, and latitude/longitude information on a position P in the vicinity of the club house C is thus registered as the takeoff and landing point of the unmanned aerial vehicle 20.

FIG. 7 is a table for showing an example of the pickup point data. As shown in FIG. 7, a relationship between a hole in which the player is playing, which is selected by the player from the order screen 40A and identification information on a pickup point is defined in the pickup point data. For example, as the identification information on the pickup point, latitude/longitude information on the pickup point may be stored. In this embodiment, it is assumed that positions $Q_5$ to $Q_9$ in the vicinity of tee grounds of the fifth hole $H_5$ to the ninth hole $H_9$ are specified as the pickup points. Which of those five positions $Q_5$ to $Q_9$ is selected as a pickup point depends on the hole selected by the player.

The data stored in the data storage 100 is not limited to the above-mentioned example. For example, the data storage 100 may store article data on articles and player data on players. For example, for each article, an image, a detailed description, an availability state, a weight, a volume, and the like of the article are stored in the article data, and are referred to in order to display the order screen 40C. Moreover, in the player data, for each player, an account, personal information, information on payment for articles, information on the moving object terminal 30, and the like of the player may be stored.

[3-2. Unmanned Aerial Vehicle Position Acquisition Module]

The controller 11 mainly implements the unmanned aerial vehicle position acquisition module 101. The unmanned aerial vehicle position acquisition module 101 is configured to acquire unmanned aerial vehicle position information on the current position of the unmanned aerial vehicle 20. The unmanned aerial vehicle position information is only required to be information that can identify the position of the unmanned aerial vehicle 20. Description is now made of a case in which the latitude/longitude information detected by the GPS sensor 24B is used as the unmanned aerial vehicle position information. The unmanned aerial vehicle position information may be information on a base station (for example, information on an access point of a wireless LAN) to/from which the communicator 33 of the unmanned aerial vehicle 20 wirelessly communicates.

For example, the unmanned aerial vehicle position acquisition module 101 is configured to carry out time keeping processing, and acquire the latest unmanned aerial vehicle position information each time a certain period elapses. In this embodiment, the administrator terminal 10 implements the unmanned aerial vehicle position acquisition module 101. Therefore, the unmanned aerial vehicle position acquisition module 101 is configured to transmit an acquisition request for the unmanned aerial vehicle position information to the unmanned aerial vehicle 20 each time the certain period elapses. When the unmanned aerial vehicle 20 receives the acquisition request, the unmanned aerial vehicle 20 transmits the latitude/longitude information detected by the GPS sensor 24B to the administrator terminal 10 as the unmanned aerial vehicle position information. The unmanned aerial vehicle position acquisition module 101 receives the transmitted unmanned aerial vehicle position information.

Even when the acquisition request is not transmitted as described above, the unmanned aerial vehicle 20 may carry out the time keeping processing so that the unmanned aerial vehicle position information is transmitted from the unmanned aerial vehicle 20 to the administrator terminal 10 each time a certain period elapses. Moreover, in this embodiment, description is made of the case in which the unmanned aerial vehicle position acquisition module 101 is configured to periodically acquire the unmanned aerial vehicle position information, but the unmanned aerial vehicle position acquisition module 101 may be configured to non-periodically acquire the unmanned aerial vehicle position information at randomly defined timing or the like.

[3-3. Moving object Position Acquisition Module]

The controller 11 mainly implements the moving object position acquisition module 102. The moving object position acquisition module 102 is configured to acquire moving object position information on a current position of the moving object moving above a surface of the earth. The moving object position information is only required to be information that can identify the position of the moving object. On this occasion, description is made of a case in which the latitude/longitude information detected by the GPS sensor 36 is used as the moving object position information. That is, in this embodiment, the GPS sensor 36 is provided in the moving object terminal 30, and the moving object position acquisition module 102 is configured to acquire the moving object position information indicating a current position of the player based on a detection signal of the GPS sensor 36 of the moving object terminal 30. The moving object position information may be information on a base station (for example, information on an access point of a wireless LAN) to/from which the communicator 33 of the moving object terminal 30 wirelessly communicates.

For example, the moving object position acquisition module 102 determines whether or not the unmanned aerial vehicle 20 has approached a predetermined place based on the unmanned aerial vehicle position information acquired by the unmanned aerial vehicle position acquisition module 101. Then, when the moving object position acquisition module 102 determines that the unmanned aerial vehicle 20 has approached the predetermined place, the moving object position acquisition module 102 transmits an acquisition request for the moving object position information to the moving object terminal 30. In order to prevent the unmanned aerial vehicle 20 from becoming an obstacle to all the players during the round, the acquisition request is transmitted not only to the moving object terminal 30 of the player who has placed the order, but also to the moving object terminals 30 of all the players during the round. When the moving object terminal 30 of each of the players receives the acquisition request, the moving object terminal 30 transmits the latitude/longitude information detected by the GPS sensor 36 to the administrator terminal 10 as the moving object position information. The moving object position acquisition module 102 receives the transmitted moving object position information.

For example, the predetermined place may be each of the holes in the golf course. Therefore, the moving object position acquisition module 102 is configured to determine whether or not the unmanned aerial vehicle 20 has approached any one of the holes based on the unmanned aerial vehicle position information and the map data. When the moving object position acquisition module 102 determines that the unmanned aerial vehicle 20 has approached any one of the holes, the moving object position acquisition module 102 transmits the acquisition request to each of the moving object terminals 30.

As described above, the moving object position acquisition module 102 may be configured not to acquire the moving object position information at the timing corresponding to the position of the unmanned aerial vehicle 20, but to non-periodically acquire the moving object position information, for example, at a timing randomly defined. Further, the moving object position acquisition module 102 may be configured not to non-periodically acquire the moving object position information, but to periodically acquire the moving object position information. For example, the moving object position acquisition module 102 may be configured to carry out time keeping processing, and acquire latest moving object position information each time a certain period elapses. In this case, the moving object position acquisition module 102 may be configured to transmit an acquisition request for the moving object position information to the moving object terminal 30 each time the certain period elapses. Even when the acquisition request is not transmitted as described above, the moving object terminal 30 may carry out the time keeping processing, and transmit the moving object position information from the moving object terminal 30 to the administrator terminal 10 each time a certain period elapses.

Moreover, although description is made of the case in which the moving object position information is acquired through the GPS sensor 36 of the moving object terminal 30, the moving object position information may be acquired through the camera 24A of the unmanned aerial vehicle 20. In this case, the moving object position information may be information on a relative position relationship between the unmanned aerial vehicle 20 and the player. Additionally, for example, when the sensor group 24 includes a heat detection sensor, the moving object position information may be acquired based on a detection result of the heat detection sensor.

[3-4. Zone Setting Module]

The controller 11 mainly implements the zone setting module 103. The zone setting module 103 is configured to set no-fly zones in which the flight of the unmanned aerial vehicle 20 is inhibited based on the moving object position information. In this embodiment, description is made of the case in which the golf players are moving bodies. Therefore, the zone setting module 103 is configured to set the no-fly zones based on the current positions of the players.

The no-fly zone is set to a region in which the unmanned aerial vehicle 20 may fly, and may mean, for example, a zone in which the flight of the unmanned aerial vehicle 20 obstructs the player, or a zone in which the player obstructs the flight of the unmanned aerial vehicle 20. In other words, the no-fly zone may mean a zone in which the flight of the unmanned aerial vehicle 20 causes a contact with the player or a hit ball, or a zone in which the flight of the unmanned aerial vehicle 20 distracts the ears and eyes of the player.

The zone setting module 103 is configured to set a no-fly zone at a position determined based on the moving object position information. For example, the zone setting module 103 may be configured to set a no-fly zone so that the no-fly zone contains a position indicated by the moving object position information. In this case, the position indicated by the moving object position information is only required to be any position inside the no-fly zone, and may be, for example, a center of gravity of a no-fly zone, or a position different from the center of gravity. Further, for example, the zone setting module 103 may be configured to set a no-fly zone that falls within a predetermined distance from the position indicated by the moving object position information, so that the no-fly zone does not contain the position. In this case, the zone setting module 103 may be configured to set the no-fly zone so that the no-fly zone surrounds the position indicated by the moving object position information, or set the no-fly zone between the position indicated by the unmanned aerial vehicle position information and the position indicated by the moving object position information.

A size and a shape of the no-fly zone may be a fixed size and a fixed shape regardless of the moving object position information. However, in this embodiment, description is made of a case in which the region setting module 103 determines at least one of the size or the shape of the no-fly zone based on the moving object position information. In other words, at least one of the size or the shape of the no-fly zone changes in accordance with the moving object position information. The size means the area of the no-fly zone. The shape means a shape of a contour of the no-fly zone. In the following, description is made of the case in which both the size and the shape of the no-fly zone are variable, but only one thereof may be variable.

A relationship between the moving object position information and the size and the shape of the no-fly zone may be described in a program, or may be stored as data in form of a numerical expression or in a form of a table in the data storage 100. The above-mentioned relationship can also be considered as a relationship between the position on the earth and the size and the shape of the no-fly zone. The zone setting module 103 is configured to set a no-fly zone having a size and a shape associated with the moving object position information acquired by the moving object position acquisition module 102. In this embodiment, it is assumed that the above-mentioned relationship is defined for each of the holes in the golf course.

Figure 8:
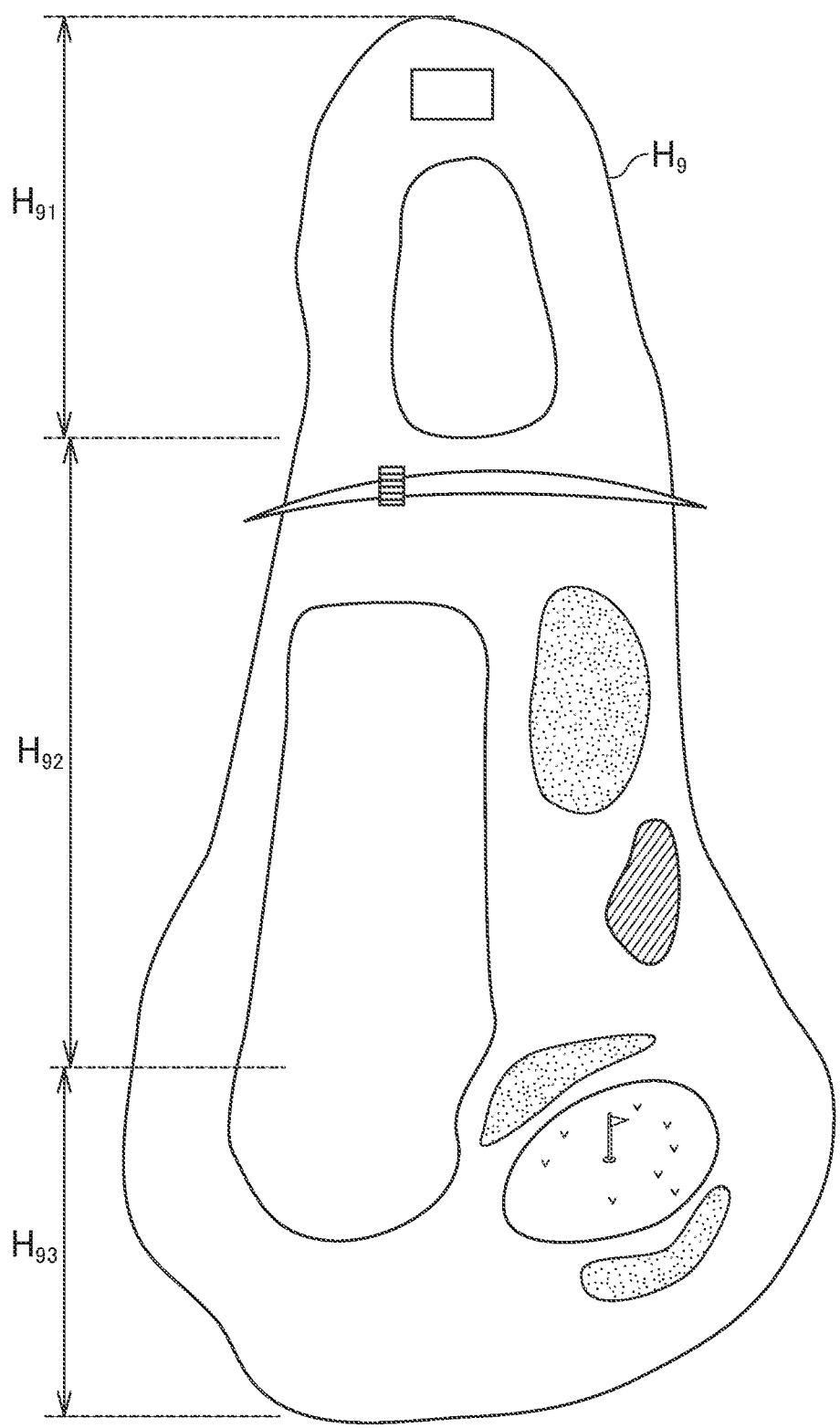
FIG. 8 is a diagram for illustrating how a no-fly zone is set.

FIG. 8 to FIG. 11 are diagrams for illustrating how no-fly zones are set. Description is now made of a no-fly zone set when the player is in the ninth hole $H_9$ as an example. As illustrated in FIG. 8, the ninth hole $H_9$ is divided into a plurality of divided regions $H_{91}$ to $H_{93}$. The divided regions $H_{91}$ to $H_{93}$ are regions of an opening stage, a middle stage, and a closing stage of the hole, respectively. Ranges in which the flight of the unmanned aerial vehicle 20 obstructs the player in the respective divided regions are different from one another. Therefore, the sizes and the shapes of the no-fly zones of the respective divided regions are different from one another.

Figure 9:
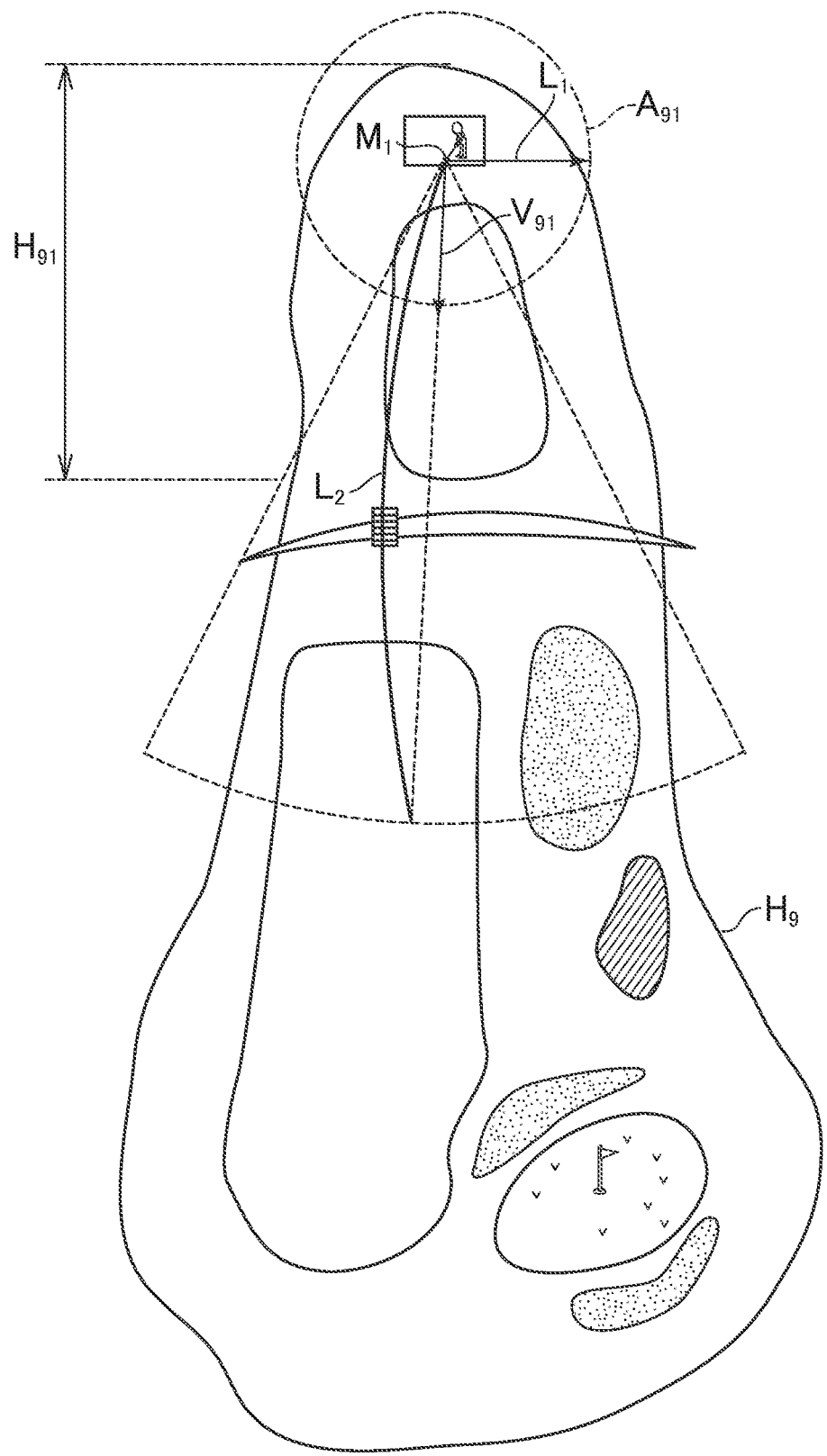
FIG. 9 is a diagram for illustrating how the no-fly zone is set.

For example, when the position indicated by the moving object position information is contained in the divided region $H_{91}$, as illustrated in FIG. 9, the zone setting module 103 sets a no-fly zone $A_{91}$ based on the moving object position information, and a reference direction $V_{91}$ associated with the divided region $H_{91}$. The reference direction $V_{91}$ is a standard shot direction at a time when a ball is in the divided region $H_{91}$, and is, for example, a front direction as viewed from the tee ground. That is, the reference direction $V_{91}$ is a direction toward which the player is predicted to hit the ball from the divided region $H_{91}$, or a direction in which the player in the divided region $H_{91}$ is predicted to see. In other words, the reference direction $V_{91}$ is a direction toward which a no-fly zone $A_{91}$ becomes wider as viewed from a position $M_1$ indicating the moving object position information.

In the example illustrated in FIG. 9, the zone setting module 103 sets the no-fly zone $A_{91}$ containing a circular region containing the position $M_1$, and having a radius $L_1$ and a circular-sector region defined based on the position $M_1$ and the reference direction $V_{91}$. The circular-sector region is a region having the position $M_1$ as a center, having a line segment that extends from the position $M_1$ in the reference direction $V_{91}$ and has a length $L_2$ as a radius, and having a predetermined center angle. The circular region is used to prevent the unmanned aerial vehicle 20 from flying around the player. That is, the circular region is used to prevent the unmanned aerial vehicle 20 from coming in contact with the player and prevent a flying noise of the unmanned aerial vehicle 20 from distracting the ears of the player. On the other hand, the circular-sector region is used to prevent the unmanned aerial vehicle 20 from flying around a ball trajectory, and is also used to prevent the unmanned aerial vehicle 20 from entering the field of vision of the player, or to prevent the unmanned aerial vehicle 20 and the ball from coming in contact with each other.

Figure 10:
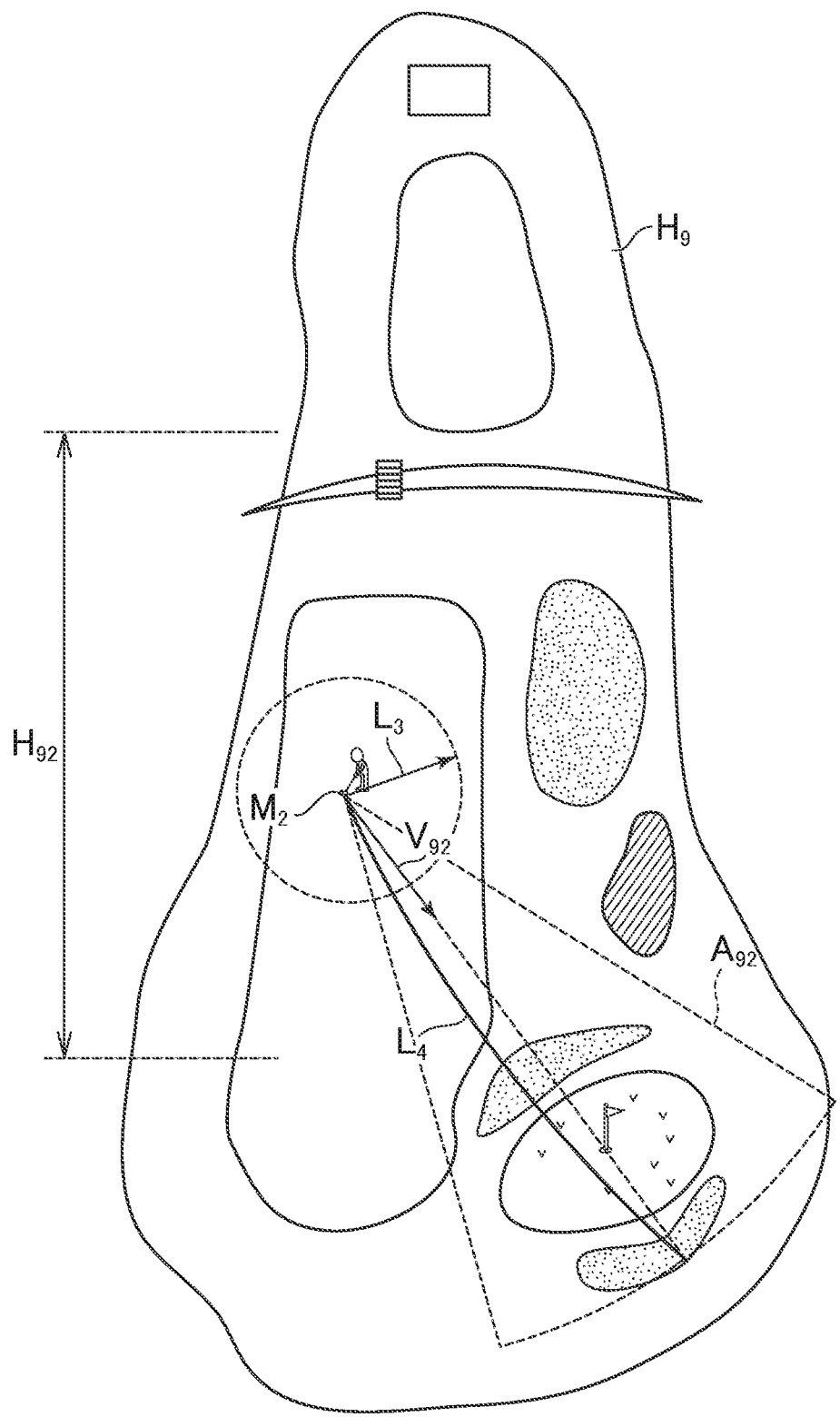
FIG. 10 is a diagram for illustrating how the no-fly zone is set.

Moreover, for example, when the position indicated by the moving object position information is contained in the divided region $H_{92}$, as illustrated in FIG. 10, the zone setting module 103 sets a no-fly zone $A_{92}$ based on the moving object position information and a reference direction $V_{92}$ associated with the divided region $H_{92}$. For example, the zone setting module 103 sets the no-fly zone $A_{92}$ containing a circular region containing a position $M_2$ indicated by the moving object position information, and having a radius $L_3$ and a circular-sector region defined based on the position $M_2$ and the reference direction $V_{92}$. The reference direction $V_{92}$ is a direction different from the reference direction $V_{91}$, and is, for example, a direction from any point in the divided region $H_{92}$ toward a pin in a green. Moreover, the radii $L_3$ and $L_4$ are respectively different from the radii $L_1$ and $L_2$. Therefore, the size and the shape of the no-fly zone $A_{92}$ are different from the size and the shape of the no-fly zone $A_{91}$.

Figure 11:
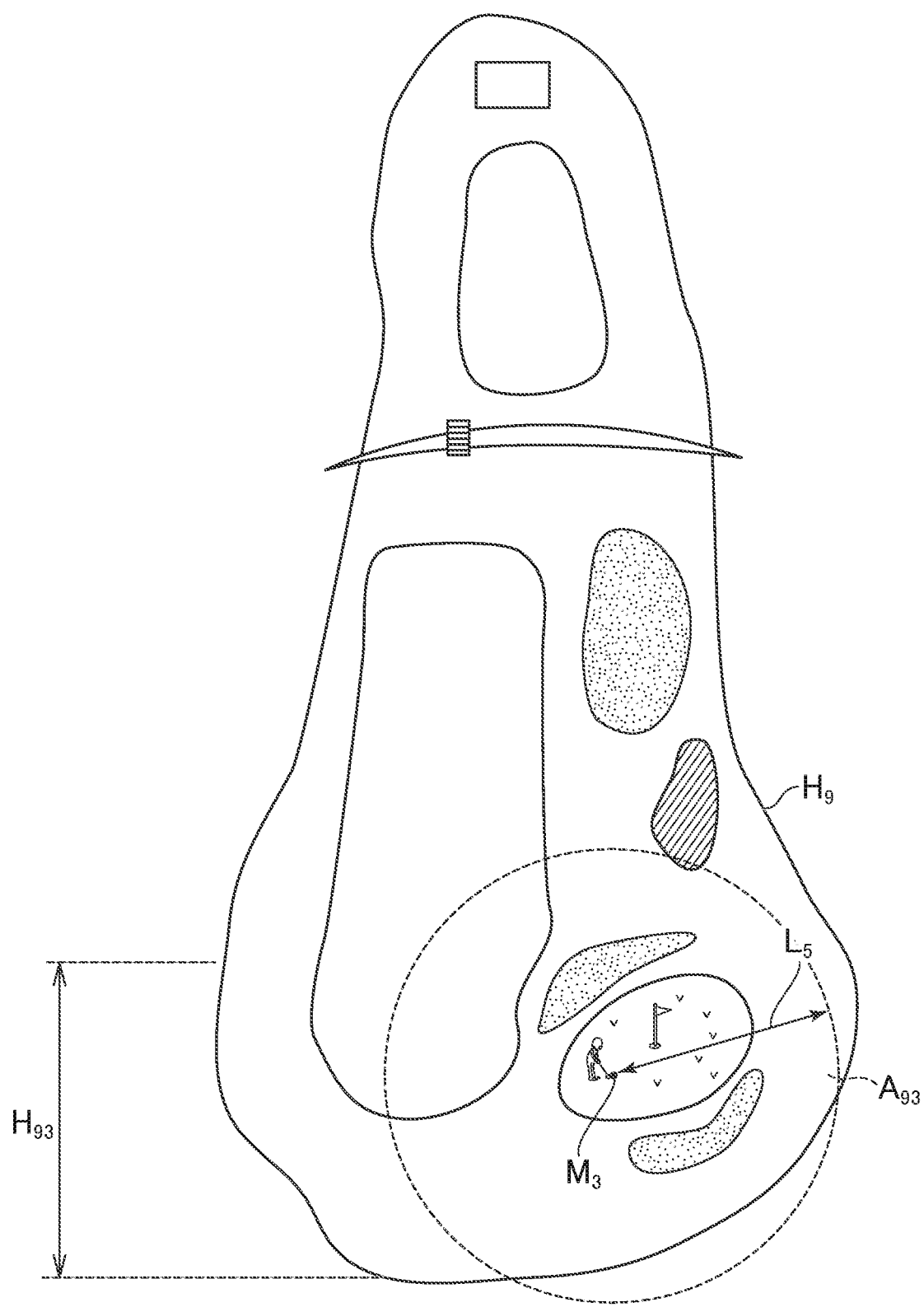
FIG. 11 is a diagram for illustrating how the no-fly zone is set.

Moreover, for example, when the position indicated by the moving object position information is contained in the divided region $H_{93}$, as illustrated in FIG. 11, the zone setting module 103 sets a circular region containing a position $M_3$ indicated by the moving object position information, and having a radius $L_5$ as a no-fly zone $A_{93}$. In such a way, the no-fly zone $A_{93}$ may be set without using a reference direction. Moreover, the divided region $H_{93}$ contains a green, and the radius $L_5$ may thus be set to be longer than the radii $L_3$ and $L_4$ so as to promote concentration of the player on a putt. The no-fly zone $A_{93}$ does not include a circular-sector region, and is thus different from the no-fly zones $A_{91}$ and $A_{92}$ in size and shape.

The no-fly zone may take any shape, and is not limited to the circle, the circular-sector, or the combination thereof described above. The no-fly zone may be a polygon such as a triangle or a quadrangle, or an ellipsoid.

[3-5. Destination Acquisition Module]

The controller 11 mainly implements the destination acquisition module 104. The destination acquisition module 104 is configured to acquire destination information on a destination of the unmanned aerial vehicle 20. The destination is a destination of the unmanned aerial vehicle 20, and, in this embodiment, is the pickup point of the articles ordered by the player or the takeoff and landing point of the unmanned aerial vehicle 20 after the delivery. Therefore, in this embodiment, the destination acquisition module 104 is configured to acquire longitude/latitude information on any one of the pickup points listed in the pickup point data, or longitude/latitude information registered as the takeoff and landing point as the destination information.

When it is permitted to freely set the destination of the unmanned aerial vehicle 20, the destination may be input from the operation device 14 or 34. That is, the destination acquisition module 104 may be configured to acquire the destination information from the data storage 100 or acquire the destination information input from the operation device 14 or 34. Moreover, in this embodiment, description is made of a case in which a destination is set, but a specific destination may not be set as in a case in which, for example, the unmanned aerial vehicle 20 circulates over the golf course.

[3-6. Flight Controller]

The controller 11 mainly implements the flight controller 105. The flight controller 105 is configured to control the flight of the unmanned aerial vehicle 20 so that the unmanned aerial vehicle 20 avoids the no-fly zones set based on the moving object position information. In this embodiment, description is made of the case in which the flight controller 105 is implemented in the administrator terminal 10, and transmission of a flight path to the unmanned aerial vehicle 20 thus corresponds to the control of the flight of the unmanned aerial vehicle 20.

For example, the flight controller 105 determines such a flight path as to avoid the no-fly zones based on a path search algorithm. The flight path that avoids the no-fly zones means that the flight path does not cross the no-fly zones at all, or a distance, a rate, or a flight period of portions of the flight path crossing the no-fly zones is less than a threshold value. As the path search algorithm itself, publicly-known various algorithms can be applied. For example, the shortest path search algorithm such as the Dijkstra's algorithm or the A* algorithm may be used. For example, the flight controller 105 sets the no-fly zones as obstacles in one of the publicly-known algorithms, and then carries out the path search for avoiding the obstacles, to thereby determine the flight path that avoids the no-fly zones.

For example, the flight controller 105 may be configured to compare a current flight path and the no-fly zones with each other, to thereby determine whether or not the current flight path avoids the no-fly zones. When the flight controller 105 determines that the current flight path avoids the no-fly zones, the flight controller 105 does not change the flight path. On the other hand, when the flight controller 105 determines that the current flight path does not avoid the no-fly zones, the flight controller 105 newly acquires a flight path that avoids the no-fly zones.

FIG. 12 is a diagram for illustrating a flight path that avoids the no-fly zone. As illustrated in FIG. 12, the current flight path $R_0$ crosses the no-fly zone $A_{92}$. Thus, the flight controller 105 determines that the current flight path $R_0$ does not avoid the no-fly zone $A_{92}$. Then, the flight controller 105 acquires a new flight path $R_1$ so that the unmanned aerial vehicle avoids the no-fly zone $A_{92}$ based on the path search algorithm. In the example of FIG. 12, the new flight path $R_1$ is a flight path along which the unmanned aerial vehicle 20 flies to the destination without crossing the no-fly zone.

For example, for an outward route, the flight controller 105 is only required to set the current position or the position of the takeoff and landing point of the unmanned aerial vehicle 20 as a start point, set the position of the pickup point as an arrival point, set the no-fly zones as obstacles, and then apply the path search algorithm to acquire a new flight path. On the other hand, for a return route, the flight controller 105 is only required to set the current position of the unmanned aerial vehicle 20 or the position of the pickup point as a start point, set the position of the takeoff and landing point of the unmanned aerial vehicle 20 as an arrival point and the no-fly zones as obstacles, and apply the path search algorithm to acquire a new flight path.

As described above, in this embodiment, the destination of the unmanned aerial vehicle 20 is defined, and thus the flight controller 105 is configured to control the flight of the unmanned aerial vehicle 20 based on the unmanned aerial vehicle position information and the destination information so that the unmanned aerial vehicle 20 arrives at the destination from the current position of the unmanned aerial vehicle 20 by avoiding the no-fly zones. Moreover, in this embodiment, description is made of the case in which the player of the golf is a moving object. Therefore, the flight controller 105 is configured to control the flight of the unmanned aerial vehicle 20 carrying packages to be brought to a predetermined point in the golf course to avoid the no-fly zones set based on the current positions of the players.

The method of acquiring the flight path that avoids the no-fly zones is not limited to the above-mentioned example. For example, the flight controller 105 may not calculate a new flight path again through the path search algorithm, but may move a portion of the current flight path contained in each of the no-fly zones toward an outside of the no-fly zone, to thereby acquire a new flight path. That is, the flight controller 105 is only required to acquire a flight path that detours the no-fly zones through any method.

4. Processing to be Executed by Unmanned Aerial Vehicle Control System

Figure 13:
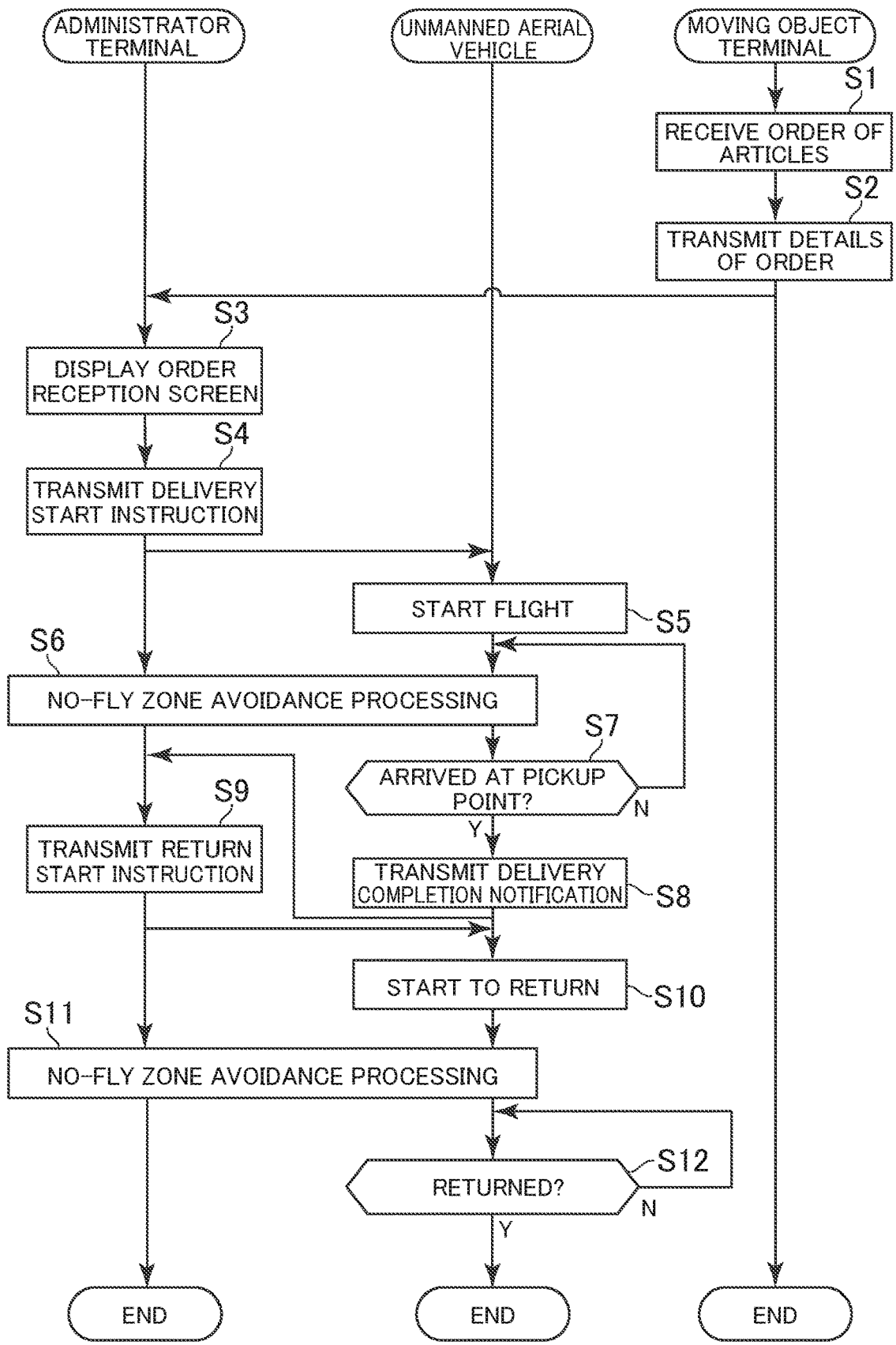
FIG. 13 is a flowchart for illustrating an example of processing carried out in the unmanned aerial vehicle control system.

FIG. 13 is a flowchart for illustrating an example of processing to be executed by the unmanned aerial vehicle control system 1. The processing illustrated in FIG. 13 is executed by the controllers 11, 21, and 31 operating in accordance with programs stored in the storages 12, 22, and 32, respectively. In this embodiment, the functional blocks illustrated in FIG. 5 are implemented through execution of processing described below.

As illustrated in FIG. 13, first, in the moving object terminal 30, the controller 31 displays an order screen 40 on the display 35, to thereby receive an order of articles from the player (Step S1). In Step S1, the order operation is carried out in accordance with the flow described with reference to FIG. 3. For example, a hole selected by the player from the order screen 40A is transmitted from the moving object terminal 30 to the administrator terminal 10. Information on a pickup point associated with the selected hole in the pickup point data is transmitted from the administrator terminal 10 to the moving object terminal 30. When the player selects the order button 41 on the order screen 40B, a predetermined notification is transmitted from the moving object terminal 30 to the administrator terminal 10, and information on the articles indicated by the article data is transmitted from the administrator terminal 10 to the moving object terminal 30. When the player selects articles from the order screen 40C, and carries out the predetermined operation, the order is established.

When the predetermined operation is carried out on the order screen 40C, the controller 31 transmits the details of the order to the administrator terminal 10 (Step S2). The details of the order transmitted in Step S2 include identification information on the moving object terminal 30 and information on the articles ordered by the player. In the administrator terminal 10, when the details of the order are received, the controller 11 displays the order reception screen 50 used to notify the administrator of the ordered articles on the display 15 (Step S3). Then, the administrator packs the articles ordered by the player in a box, and loads and fixes the box in the package storage 25.

When the administrator selects the delivery instruction button 51, the controller 11 determines the shortest path to the pickup point as an initial flight path for the outward route based on the map data and the pickup point data, and transmits a delivery start instruction to the unmanned aerial vehicle 20 (Step S4). In Step S4, the controller 11 acquires the latitude/longitude information on the takeoff and landing point registered to the storage 12, and the latitude/longitude information on the pickup point stored in the pickup point data. Then, the controller 11 refers to the map data to acquire latitude/longitude information on the shortest path from the takeoff and landing point to the pickup point, and determines the latitude/longitude information as the initial flight path for the outward route. The delivery start instruction contains the initial flight path for the outward route.

In the unmanned aerial vehicle 20, when the delivery start instruction is received, the controller 21 starts the flight based on the initial flight path for the outward route (Step S5). Publicly-known various autonomous flight control can be applied to a method itself of flying based on a specified flight path. For example, the unmanned aerial vehicle 20 considers the unmanned aerial vehicle position information detected by the GPS sensor 24B as the current position of the own vehicle, and controls the respective propellers so as to move at the latitude and the longitude indicated by the flight path. For example, the unmanned aerial vehicle 20 does not horizontally move when numbers of rotations of the respective propellers are the same or approximately the same, and moves toward a direction of a propeller relatively lower in number of rotations when the number of rotations of the respective propellers are different from one another. Therefore, parameters indicating the number of rotations of the respective propellers are only required to be determined so as to relatively reduce the number of rotations of the propellers on a flight direction side indicated by the flight path. The unmanned aerial vehicle 20 is only required to identify an attitude and the direction of the own vehicle through a gyro sensor or a geomagnetic sensor.

When the unmanned aerial vehicle 20 starts the flight, no-fly zone avoidance processing for the unmanned aerial vehicle 20 to avoid the no-fly zones in the outward route is carried out between the administrator terminal 10 and the unmanned aerial vehicle 20 (Step S6).

Figure 14:
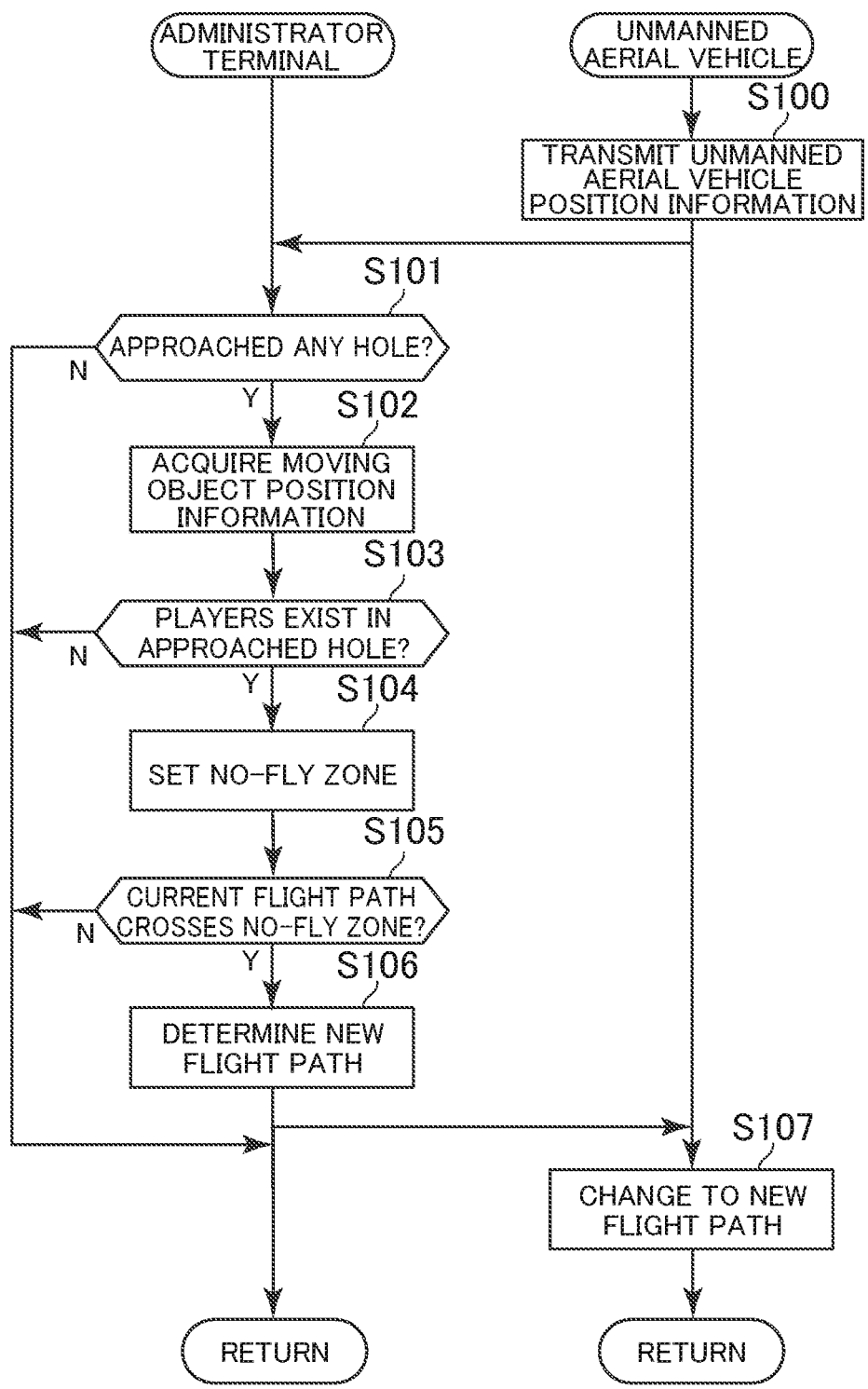
FIG. 14 is a flowchart for illustrating, in detail, no-fly zone avoidance processing.

FIG. 14 is a flowchart for illustrating, in detail, the no-fly zone avoidance processing. As illustrated in FIG. 14, in the unmanned aerial vehicle 20, the controller 21 periodically transmits the unmanned aerial vehicle position information detected by the GPS sensor 24B to the administrator terminal 10 (Step S100). In Step S100, the controller 21 carries out the time keeping processing, to thereby transmit the latest unmanned aerial vehicle position information to the administrator terminal 10 each time the certain period elapses.

In the administrator terminal 10, when the unmanned aerial vehicle position information is received, the controller 11 determines whether or not the unmanned aerial vehicle 20 has approached any one of the holes based on the unmanned aerial vehicle position information and the map data (Step S101). The latitude/longitude information on each of the holes is indicated in the map data. Therefore, in Step S101, the controller 11 determines whether or not a distance between the position indicated by the unmanned aerial vehicle position information and each of the holes has become less than a threshold value.

When it is not determined that the unmanned aerial vehicle 20 has approached any one of the holes (N in Step S101), the no-fly zone avoidance processing is finished. In this case, the unmanned aerial vehicle 20 is not flying in a vicinity of each of the holes, and a probability that players are not close to the unmanned aerial vehicle 20 is thus high. Therefore, it is considered that the flight path is not required to be changed, and the flight is continued while the current flight path is maintained.

On the other hand, when it is determined that the unmanned aerial vehicle 20 has approached any one of the holes (Y in Step S101), the controller 11 transmits an acquisition request for the moving object position information to each of the moving object terminals 30, to thereby acquire the moving object position information (Step S102). In Step S102, the controller 11 transmits the acquisition request not only to the moving object terminal 30 of the player who has placed the order, but also to the moving object terminals 30 of all the players during the round, to thereby acquire the moving object position information.

It is assumed that the administrator terminal 10 and the moving object terminals 30 of the respective players are connected to one another in advance so as to be capable of transmitting/receiving data. Moreover, identification information (for example, the IP address or individual identification information) for identifying the moving object terminal 30 of each of the players is stored in the storage 12 in advance. The controller 11 thus transmits the acquisition request for the moving object position information based on the identification information. It is assumed that the moving object terminal 30 of each of the players is set in advance to automatically provide the moving object position information when the acquisition request is received.

The controller 11 determines whether or not players exist in the hole that the unmanned aerial vehicle 20 has approached based on the map data and the moving object position information (Step S103). In Step S103, the controller 11 determines whether or not the moving object position information is detected in the hole that the unmanned aerial vehicle 20 has approached, or in a region within a predetermined distance from this hole.

When it is determined that players do not exist (N in Step S103), the no-fly zone avoidance processing is finished. In this case, players do not exist in the hole that the unmanned aerial vehicle 20 has approached, and crossing this hole does not pose any problem. Thus, the unmanned aerial vehicle 20 continues the flight while the current flight path is maintained.

On the other hand, when it is determined that players exist (Y in Step S103), the controller 11 sets a no-fly zone to the hole that the unmanned aerial vehicle 20 has approached based on the moving object position information (Step S104). In Step S104, the controller 11 determines the size and the shape of the no-fly zone based on the moving object position information in the hole that the unmanned aerial vehicle 20 has approached, or in a region within a predetermined distance from this hole. The controller 11 sets the no-fly zone having the determined size and shape on the map indicated by the map data.

The controller 11 determines whether or not the current flight path crosses the no-fly zone set in Step S104 (Step S105). In Step S105, the controller 11 determines whether or not the latitude/longitude information on the flight path is contained in the no-fly zone.

When it is not determined that the flight path crosses the no-fly zone (N in Step S105), the no-fly zone avoidance processing is finished. In this case, players exist in the hole that the unmanned aerial vehicle 20 has approached, but the unmanned aerial vehicle 20 does not fly close to the players, and crossing this hole thus does not pose any problem. Thus, the unmanned aerial vehicle 20 continues the flight while the current flight path is maintained.

On the other hand, when it is determined that the unmanned aerial vehicle 20 crosses the no-fly zone (Y in Step S105), the controller 11 determines a new flight path so that the unmanned aerial vehicle 20 avoids the no-fly zone set in Step S104, and transmits the new flight path to the unmanned aerial vehicle 20 (Step S106). In Step S106, the controller 11 calculates a flight path from the latest unmanned aerial vehicle position information to the destination (the pickup point for the outward route or the takeoff and landing point for the return route) that detours the no-fly zone based on the path search algorithm.

In the unmanned aerial vehicle 20, when the new flight path is received, the controller 21 changes the flight path to the new flight path (Step S107), and the no-fly zone avoidance processing is finished. In Step S107, the controller 21 switches the flight path referred to in the autonomous flight control to the new flight path.

Returning to FIG. 13, when the no-fly zone avoidance processing in Step S6 is carried out, in the unmanned aerial vehicle 20, the controller 21 determines whether or not the unmanned aerial vehicle 20 has arrived at the pickup point based on the unmanned aerial vehicle position information detected by the GPS sensor 24B (Step S7). In Step S7, the controller 21 determines whether or not the unmanned aerial vehicle position information and latitude/longitude information at an end point of the flight path for the outward route match each other.

When it is not determined that the unmanned aerial vehicle 20 has arrived at the pickup point (N in Step S7), the no-fly zone avoidance processing in Step S6 is carried out again, and the flight path is adjusted so that the unmanned aerial vehicle 20 avoids no-fly zones until the arrival at the pickup point.

On the other hand, when it is determined that the unmanned aerial vehicle 20 has arrived at the pickup point (Y in Step S7), the controller 21 unloads the articles at the pickup point, and transmits a predetermined delivery completion notification to the administrator terminal 10 (Step S8). In Step S8, the controller 21 reduces the number of rotations of the respective propellers to reduce the height of the unmanned aerial vehicle 20, to thereby cause the unmanned aerial vehicle 20 to land on the ground. A predetermined mark for guiding the landing location may be placed at the pickup point, and the controller 21 may use the camera 24A to detect this mark, to thereby increase the precision of the landing position. When the unmanned aerial vehicle 20 has landed, the controller 21 controls the motor so that the unmanned aerial vehicle 20 opens the arms 25B of the package storage 25, to thereby drop the package downward by some centimeters. The controller 21 may determine that the unmanned aerial vehicle 20 has landed when the number of rotations of the propellers are set to 0. Alternatively, a pressure-sensitive sensor may be placed on a surface of the unmanned aerial vehicle 20 that comes in contact with the ground, and the landing may be detected based on a detection signal of the pressure-sensitive sensor. Moreover, the delivery completion notification is only required to be carried out in a predetermined data format.

In the administrator terminal 10, when the delivery completion notification is received, the controller 11 determines an initial flight path for the return route, and transmits the return start instruction (Step S9). In Step S9, the controller 11 acquires the latitude/longitude information on the takeoff and landing point registered to the storage 12, and the latest unmanned aerial vehicle position information or latitude/longitude information on the pickup point. Then, the controller 11 refers to the map data to acquire latitude/longitude information on the shortest path from the current position of the unmanned aerial vehicle 20 or the pickup point to the takeoff and landing point, and determines the shortest path as the initial flight path for the return route. The return start instruction contains the initial flight path for the return route.

In the unmanned aerial vehicle 20, when the return start instruction is received, the controller 21 starts the return to the takeoff and landing point based on the initial flight path for the return route contained in the return start instruction (Step S10). The no-fly zone avoidance processing for the unmanned aerial vehicle 20 to avoid no-fly zones is carried out between the administrator terminal 10 and the unmanned aerial vehicle 20 (Step S11). In Step S11, the processing in Step S100 to Step S107 is carried out again, and when the unmanned aerial vehicle 20 has approached any one of the holes, the flight path is adjusted so as not to fly close to players existing in the hole.

In the unmanned aerial vehicle 20, the controller 21 determines whether or not the unmanned aerial vehicle 20 has arrived at the takeoff and landing point based on the unmanned aerial vehicle position information detected by the GPS sensor 26B (Step S12). In Step S12, the controller 21 determines whether or not the unmanned aerial vehicle position information and latitude/longitude information at an end point of the flight path for the return route match each other.

When it is not determined that the unmanned aerial vehicle 20 has arrived at the takeoff and landing point (N in Step S12), the no-fly zone avoidance processing in Step S11 is carried out again, and the flight path is adjusted so that the unmanned aerial vehicle 20 avoids no-fly zones until the arrival at the takeoff and landing point. On the other hand, when it is determined that the unmanned aerial vehicle 20 has arrived at the takeoff and landing point (Y in Step S12), this processing is finished. In this case, the unmanned aerial vehicle 20 reduces the number of rotations of the propellers so as to land on the takeoff and landing point.

With the above-mentioned unmanned aerial vehicle control system 1, the unmanned aerial vehicle 20 flies so as to avoid the no-fly zones set based on the moving object position information. Therefore, the unmanned aerial vehicle 20 can be caused to fly so as to avoid the no-fly zones changing in accordance with the movements of the moving bodies. That is, even when the no-fly zone changes in accordance with the movements of the moving bodies, the unmanned aerial vehicle can be caused to fly so as to avoid this no-fly zone. Therefore, it is possible to reliably prevent the unmanned aerial vehicle 20 from becoming an obstacle to the moving object on the ground, and to reliably prevent the moving object on the ground from becoming an obstacle to the unmanned aerial vehicle 20.

Moreover, the flight controller 105 determines the flight path to the destination such as the pickup point or the takeoff and landing point by avoiding no-fly zones. Thus, the unmanned aerial vehicle 20 can be caused to fly so as to arrive at the destination from the current position of the unmanned aerial vehicle 20 by avoiding the no-fly zones. Therefore, the unmanned aerial vehicle 20 can be caused to more reliably arrive at the destination. Further, it is also possible to prevent the unmanned aerial vehicle 20 from becoming an obstacle to a moving object existing up to the destination, and to prevent a moving object existing up to the destination from becoming an obstacle to the unmanned aerial vehicle 20.

Moreover, the unmanned aerial vehicle 20 can be caused to fly so as to avoid a no-fly zone the size and the shape of which are determined by the zone setting module 103 based on the moving object position information. That is, the size and the shape of the no-fly zone can be optimized in accordance with the moving object position information. Therefore, it is possible to reliably prevent the unmanned aerial vehicle 20 from becoming an obstacle to the moving object, and to reliably prevent the moving object from becoming an obstacle to the unmanned aerial vehicle 20.

Moreover, as described in the embodiment, when the moving object position information indicates the position of the player playing in the golf course, the unmanned aerial vehicle 20 can be caused to fly by avoiding a no-fly zone changing in accordance with a movement of the player in the golf course. Therefore, when the unmanned aerial vehicle 20 delivers a package in the golf course, it is possible to reliably prevent the unmanned aerial vehicle 20 from becoming an obstacle to a player in the round (for example, prevent the unmanned aerial vehicle 20 from becoming a visual or auditory obstacle that decreases player's concentration or from being hit by the hit ball), and to reliably prevent the player from becoming an obstacle to the unmanned aerial vehicle 20 (for example, prevent a hit ball from hitting the unmanned aerial vehicle 20). As a result, the unmanned aerial vehicle 20 can reliably complete the delivery of the package and the return to the club house.

5. Modification Examples

The present invention is not limited to the embodiment described above, and can be modified suitably without departing from the spirit of the present invention.

Figure 15:
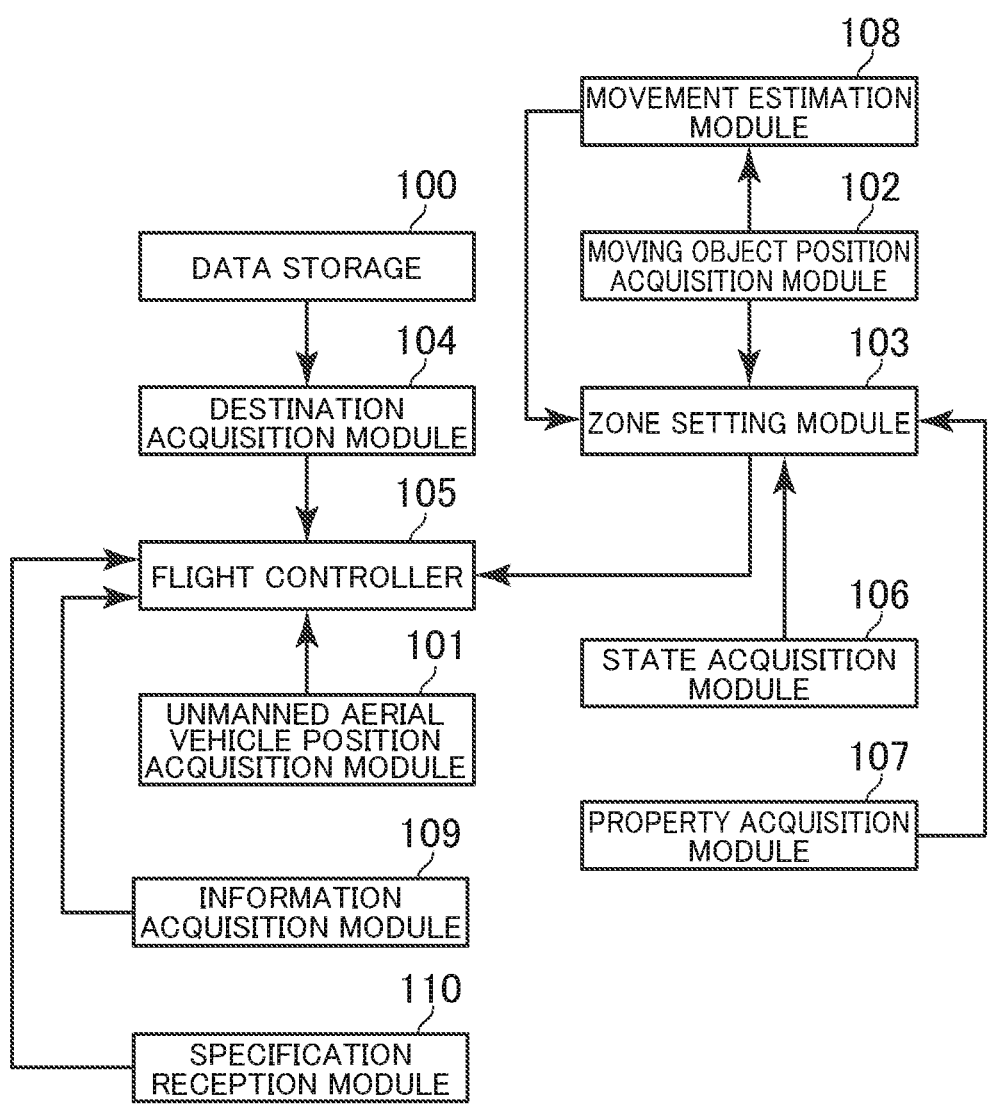
FIG. 15 is a functional block diagram in modification examples of the present invention.

FIG. 15 is a functional block diagram in modification examples of the present invention. As illustrated in FIG. 15, in the modification examples described below, a state acquisition module 106, a property acquisition module 107, a movement estimation module 108, an information acquisition module 109, and a specification reception module 110 are implemented in addition to the functions of the embodiment. Now, description is made of a case in which the administrator terminal 10 implements those functions.

(1) For example, even when the player is at the same position, a no-fly zone may differ in accordance with a state at that time. For example, when the player is moving, the player does not immediately hit a shot. Therefore, when the unmanned aerial vehicle 20 comes in the sight of the player or a direction of a hit ball, a possibility that the hit ball does not become an obstacle is high, and a no-fly zone may be set to be narrow. On the other hand, when the player is not moving, the player is in the address position, or is checking a shot direction. Therefore, when the unmanned aerial vehicle 20 comes in the sight of the player or the direction of the hit ball, a possibility that the unmanned aerial vehicle 20 becomes an obstacle is high, and the no-fly zone may set to be wide. Therefore, in Modification Example (1) of the present invention, description is made of a case in which the no-fly zone is set in accordance with a current state of the player.

The unmanned aerial vehicle control system 1 in Modification Example (1) includes the state acquisition module 106. The controller 11 mainly implements the state acquisition module 106. The state acquisition module 106 is configured to acquire moving object state information on a current state of the moving object. In modification examples described below, description is made of the player as an example of the moving object as in the embodiment. Therefore, the moving object state information indicates the current state of the player.

For example, the moving object state information may indicate a movement state of the player, a motion of the player, a direction of the player, or the like. On this occasion, description is made of a case in which the moving object state information is on the current movement state of the player. The movement state may indicate whether or not the player is moving, a movement direction, or a movement speed. Description is now made of a case in which the movement state indicates whether or not the player is moving. When the state indicates that the player is moving, it means that a movement amount (a change amount of the moving object position information) per unit period is equal to or larger than a threshold value.

For example, the state acquisition module 106 is configured to acquire the moving object state information based on a chronological change in moving object position information. When the change amount of the moving object position information per unit period is less than the threshold value, the state acquisition module 106 determines that the moving object is not moving, and acquires the moving object state information indicating that the moving object is not moving. On the other hand, when the change amount of the moving object position information per unit period is equal to or more than the threshold value, the state acquisition module 106 determines that the moving object is moving, and acquires the moving object state information indicating that the moving object is moving.

The zone setting module 103 sets a no-fly zone based on the moving object state information. A relationship between the moving object state information and the no-fly zone may be described in a program, or may be stored in the data storage 100 as data in a form of a numerical expression or in a form of a table. In this relationship, the moving object state information and at least one of the position, the size, or the shape of the no-fly zone may be defined. The zone setting module 103 sets a no-fly zone associated with the moving object state information acquired by the state acquisition module 106.

On this occasion, description is made of the case in which the moving object state information indicates the movement state. Therefore, the zone setting module 103 is configured to set the no-fly zone based on the current movement state indicated by the moving object state information. For example, the zone setting module 103 is configured to change at least one of the position, the size, or the shape of the no-fly zone between the case in which the player is moving and the case in which the player is not moving.

Figure 16:
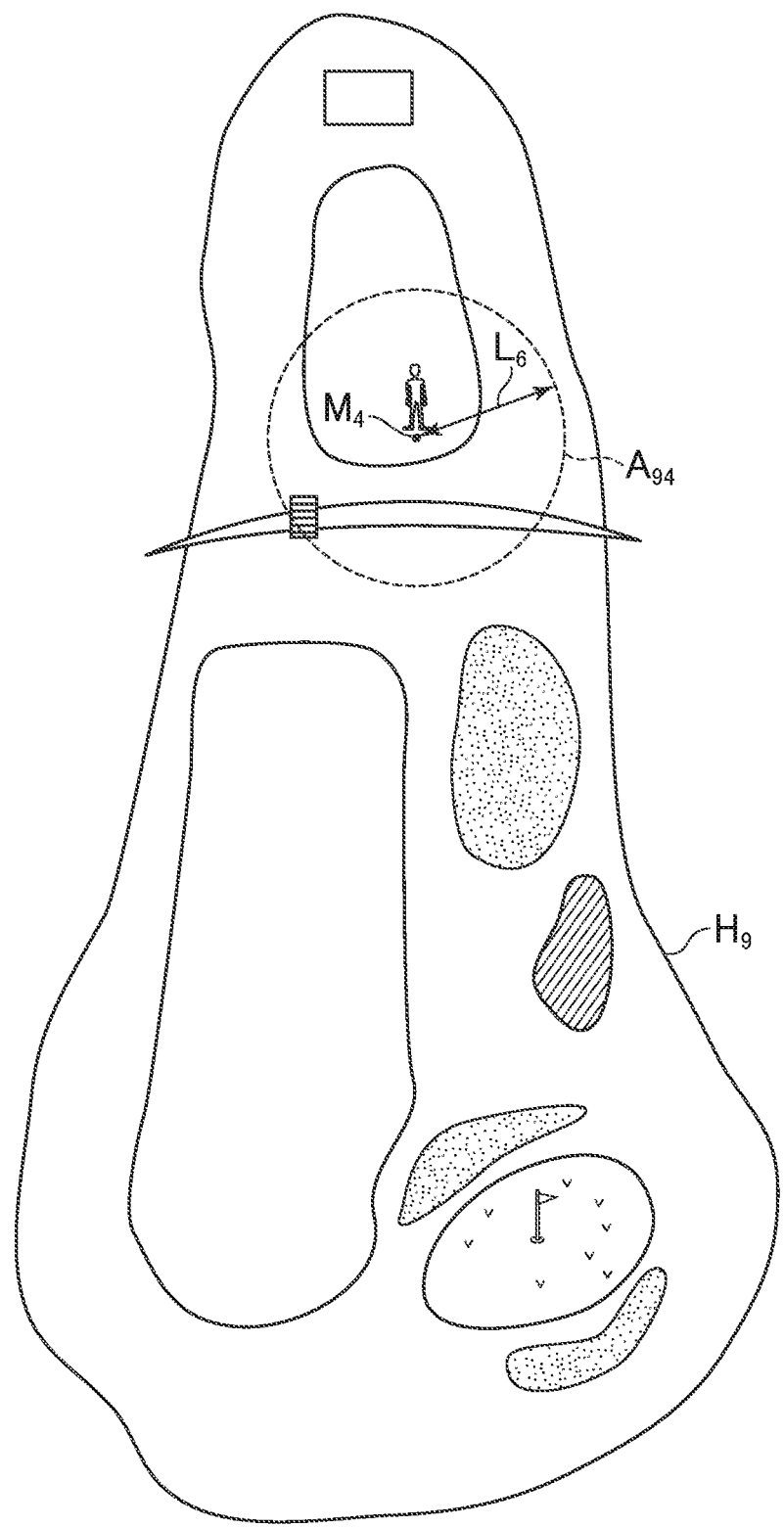
FIG. 16 is a diagram for illustrating the no-fly zone set while the player is moving.
Figure 17:
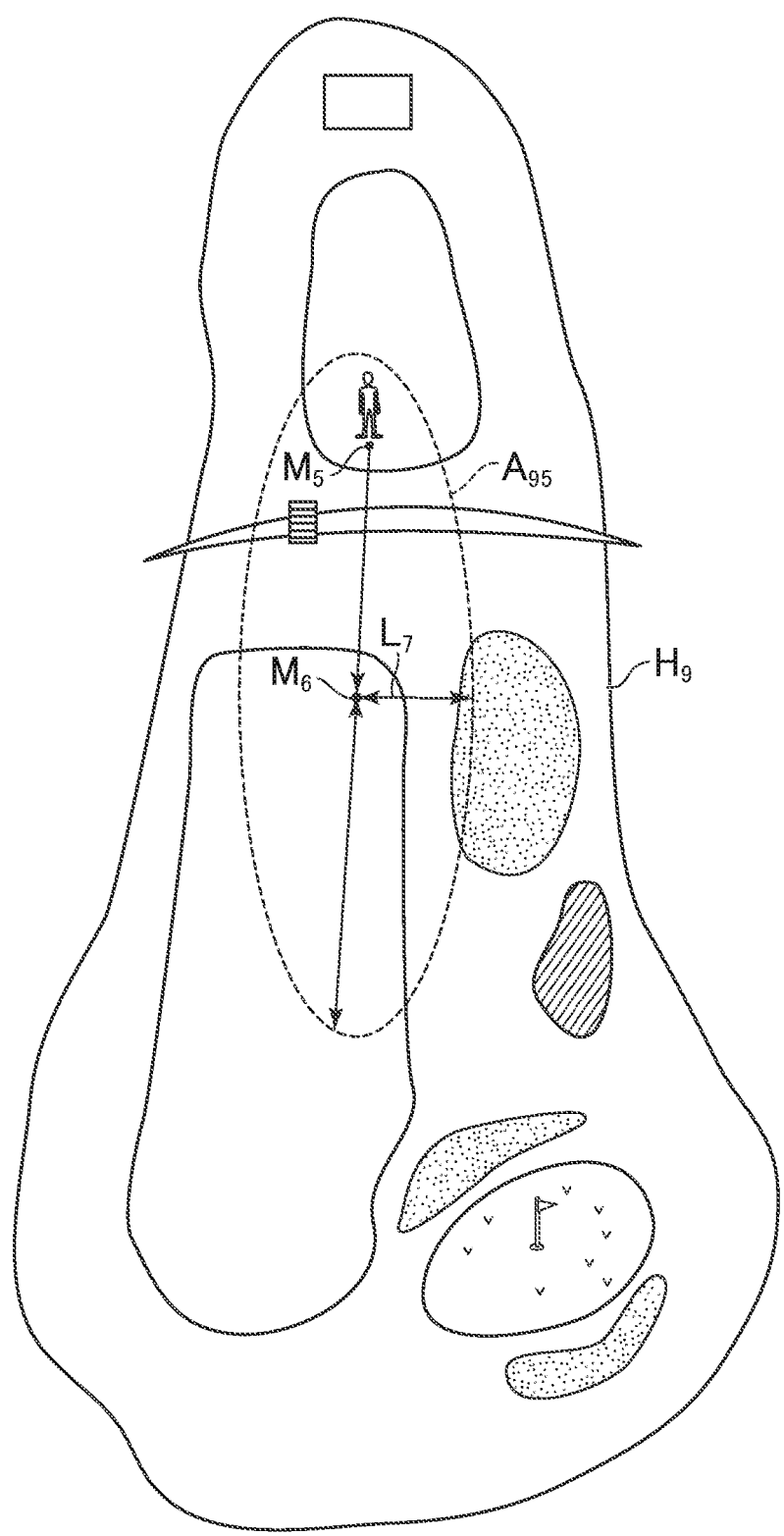
FIG. 17 is a diagram for illustrating the no-fly zone set while the player is not moving.

FIG. 16 is a diagram for illustrating a no-fly zone set while the player is moving. FIG. 17 is a diagram for illustrating a no-fly zone set while the player is not moving. As illustrated in FIG. 16, when the moving object state information indicates that the player is moving, the zone setting module 103 sets a circle having a radius $L_6$ about a position $M_4$ of the player indicated by the moving object position information as a no-fly zone $A_{94}$. That is, when the player is moving, the player does not immediately hit a shot. Therefore, the no-fly zone $A_{94}$ relatively small in size may be set without particularly considering the direction of the hit ball.

Moreover, for example, as illustrated in FIG. 17, when the moving object state information indicates that the player is not moving, the zone setting module 103 sets an ellipsoid having a minor axis $L_7$ and a major axis $L_8$ about a position $M_6$, which is obtained by displacing the position $M_5$ of the player indicated by the moving object position information in a predetermined direction by a predetermined distance, as a no-fly zone $A_{95}$. That is, when the player is not moving, the player may immediately hit a shot, and thus the no-fly zone $A_{95}$ having a relatively large size may be set in consideration of the direction of the hit ball.

As illustrated in FIG. 16 and FIG. 17, for example, the zone setting module 103 may be configured to determine a no-fly zone so that a no-fly zone in the case in which the player is not moving is wider than a no-fly zone in the case in which the player is moving. The flight controller 105 is configured to determine a flight path that avoids the no-fly zone set by the zone setting module 103 in accordance with the moving object state information. The determination method itself for the flight path that avoids the no-fly zone may be similar to the method described in the embodiment. This applies to modification examples described later.

With Modification Example (1), the unmanned aerial vehicle 20 can be caused to fly so as to avoid the no-fly zone in accordance with the moving object state information. The no-fly zone is set in accordance with the state of the player at the subject time point, and the unmanned aerial vehicle 20 can more reliably be prevented from becoming an obstacle to the plyer or the player can more reliably be prevented from becoming an obstacle to the unmanned aerial vehicle 20. Further, for example, a no-fly zone unnecessarily large for the state of the player at the subject time point can also be prevented from being set, and the unmanned aerial vehicle 20 can thus be prevented from wastefully making a large detour. As a result, power consumption of the unmanned aerial vehicle 20 can be reduced, and the arrival time at the destination can be advanced.

Moreover, when the moving object state information indicates the state in which the player is moving, the unmanned aerial vehicle 20 can be caused to fly so as to avoid a no-fly zone in accordance with the movement state of the player. That is, an optimal no-fly zone can be set in accordance with the movement state of the player.

A no-fly zone to be set in accordance with the moving object state information is only required to be defined in accordance with a situation in which the unmanned aerial vehicle control system 1 is used, a type of the moving object, and the like. For example, when the moving object is a train, the zone setting module 103 may set a no-fly zone so that the no-fly zone is wider in the case in which the moving object state information indicates that the moving object is moving than in the case in which the moving object state information indicates that the moving object is not moving in order to secure a spatial margin for avoiding a contact with the unmanned aerial vehicle 20, which is opposite to the above-mentioned modification example.

Moreover, for example, as described above, the movement state may indicate the movement direction. In this case, the state acquisition module 106 is only required to acquire the movement direction based on a chronological change in moving object position information. For example, the zone setting module 103 may be configured to set a no-fly zone so that the no-fly zone is wider toward a direction indicated by the moving object state information.

Moreover, for example, the movement state may indicate the movement speed. In this case, the state acquisition module 106 is only required to acquire the movement speed based on a chronological change in moving object position information. For example, the zone setting module 103 may be configured to increase the no-fly zone as the movement speed indicated by the moving object state information increases, and reduce the no-fly zone as the movement speed decreases in order to secure the spatial margin for avoiding the contact with the unmanned aerial vehicle 20. Moreover, for example, conversely to the description made before, the zone setting module 103 may be configured to estimate whether or not the player is in the address position in accordance with the movement speed, reduce the no-fly zone as the moving object speed indicated by the moving object state information increases, and increase the no-fly zone as the moving object speed decreases.

Moreover, for example, as described above, the moving object state information may indicate a state other than the movement state. For example, when the moving object state information indicates a type of the motion, the state acquisition module 106 may acquire the type of the motion based on a change in the moving object position information, or acquire the type of the motion based on an image taken by the camera 24A of the unmanned aerial vehicle 20. In this case, the zone setting module 103 is configured to set the no-fly zone in accordance with the motion. For example, when the player is presenting an address motion, the zone setting module 103 may set a larger no-fly zone than when the player is presenting a walking motion.

Moreover, for example, when the moving object state information indicates a direction (for example, a direction of the face, a direction of the body, or the like of the player), the state acquisition module 106 may be configured to acquire the direction based on a change in moving object position information, or acquire the direction based on the image taken by the camera 24A of the unmanned aerial vehicle 20. In this case, the zone setting module 103 sets the no-fly zone in accordance with the direction. For example, the zone setting module 103 may be configured to set the no-fly zone so that the no-fly zone is wider toward the direction of the face or the direction of the body of the player.

(2) Moreover, for example, in the embodiment, description is made of the case in which the moving object is a human, but, as described above, the moving object may be an automobile, a motorbike, or a train. Ways of the movement of the human, the four-wheeled motor vehicle, the two-wheeled motor vehicle, and the train are different from one another. Therefore, the no-fly zone may be changed in accordance with what the moving object is.

The unmanned aerial vehicle control system 1 of Modification Example (2) of the present invention includes the property acquisition module 107. The controller 11 mainly implements the property acquisition module 107. The nature acquisition module 107 is configured to acquire moving object property information on a property of the moving object. The property is information on what the moving object is. In other words, the property may be a class defined in accordance with taxonomy, a type or a purpose of use of the moving object, or capability or performance of the moving object. In the following, description is made of a case in which the moving object property information indicates whether the moving object is a human, an automobile, a motorbike, or a train.

For example, the property acquisition module 107 may be configured to acquire the moving object property information based on the details of communication to/from the moving object terminal 30. The property acquisition module 107 is configured to acquire the identification information on the moving object terminal 30 from the moving object terminal 30, and acquire the moving object property information based on this identification information. In this case, it is assumed that data indicating a relationship between the identification information on the moving object terminal 30 and the moving object property information is stored in the data storage 100 in advance. This relationship indicates such a relationship that, for example, one moving object terminal 30 moves together with a human, and another moving object terminal 30 moves together with an automobile. The property acquisition module 107 is configured to acquire the moving object property information associated with the identification information acquired from the moving object terminal 30. As a result, the unmanned aerial vehicle control system 1 can identify what the moving object is.

The moving object property information may be input from the operation devices 14 and 34. In this case, the property acquisition module 107 is configured to acquire the moving object property information input from the operation devices 14 and 34. Moreover, for example, the moving object property information may be acquired based on the image taken by the camera 24A of the unmanned aerial vehicle 20. In this case, the property acquisition module 107 may apply image analysis to the taken image of the ground taken by the camera 24, to thereby acquire the moving object property information. In this image analysis, template matching through template images indicating typical shapes of a human, an automobile, and the like may be carried out.

The zone setting module 103 sets a no-fly zone based on the moving object property information. A relationship between the moving object property information and the no-fly zone may be described in a program, or may be stored in the data storage 100 as data in a form of a numerical expression or in a form of a table. In this relationship, the moving object property information and at least one of the position, the size, or the shape of the no-fly zone may be defined. The zone setting module 103 sets a no-fly zone associated with the moving object property information acquired by the property acquisition module 107.

For example, the zone setting module 103 may be configured to set a no-fly zone having a size and a shape associated with the moving object property information at a position associated with the moving object property information. In other words, the zone setting module 103 changes the no-fly zone to be set in accordance with the properties indicated by the moving object property information.

For example, in a case in which the moving object property information indicates an automobile or a train, the zone setting module 103 may set a larger no-fly zone than that of a case in which the moving object property information indicates a human. Moreover, for example, movable directions of a four-wheeled vehicle and a train are limited, and they cannot quickly change the directions. Therefore, in the case in which the moving object property information indicates an automobile or a train, the zone setting module 103 may set a no-fly zone so that the no-fly zone is wider toward a moving direction side compared with that of the case in which the moving object property information indicates a human.

With Modification Example (2), the unmanned aerial vehicle 20 can be caused to fly so as to avoid a no-fly zone set in accordance with the moving object property information. That is, the no-fly zone changes in accordance with what the moving object is, and the unmanned aerial vehicle 20 can more reliably be prevented from becoming an obstacle to the moving object or the moving object can more reliably be prevented from becoming an obstacle to the unmanned aerial vehicle 20. Further, for example, a no-fly zone unnecessarily large for the property of the moving object can also be prevented from being set, and the unmanned aerial vehicle 20 can thus be prevented from wastefully making a large detour. As a result, power consumption of the unmanned aerial vehicle 20 can be reduced, and the arrival time at the destination can be advanced.

Even when objects have the same name in terms of taxonomy, a no-fly zone may be changed in accordance with the type of object. For example, for the same trains, a bullet train and a conventional train have different travel speeds. Therefore, a no-fly zone may be changed in accordance with the type of train. In this case, the moving object property information indicates the type of train. Therefore, when the moving object property information indicates a bullet train, the zone setting module 103 may set a larger no-fly zone than that of a case in which the moving object property information indicates a conventional train.

Moreover, for example, for the same automobile, a vehicle on an express way and a vehicle on a general road have different movement speeds. Therefore, a no-fly zone may be changed in accordance with where the automobile moves. In this case, the moving object property information indicates where the automobile moves. Therefore, when the moving object property information indicates an automobile on an express way, the zone setting module 103 may set a larger no-fly zone than that of a case in which the moving object property information indicates a four-wheeled vehicle on a general road.

Moreover, for example, for the same buses, a no-fly zone may be changed between a route bus and a sightseeing bus. For example, the route bus often starts immediately after stopping at a bus stop and taking passengers, but the sightseeing bus often starts after parking for a while until sightseeing is finished. The moving object property information may indicate the purpose of use of the moving object, and the zone setting module 103 may be configured to set a no-fly zone based on the purpose of use indicated by the moving object property information. For example, the zone setting module 103 may be configured to set a larger no-fly zone in the case of the route bus than that of the sightseeing bus.

Moreover, for example, a ball flight distance varies in accordance with the player, and the no-fly zone may be changed in accordance with the ball flight distance of the player. In this case, the moving object property information indicates the ball flight distance of a player (namely, ability of the player). Therefore, the zone setting module 103 may be configured to increase the no-fly zone as the ball flight distance indicated by the moving object property information increases, and reduce the no-fly zone as the ball flight distance indicated by the moving object property information decreases.

(3) Moreover, for example, description is made of the case in which the unmanned aerial vehicle control system 1 of the embodiment adjusts the flight path in accordance with the positions of the players when the flying unmanned aerial vehicle 20 has approached the hole, but the flight path may be determined by estimating movements of the players in advance. In this modification example, description is made of a case in which the unmanned aerial vehicle control system 1 estimates the movements of the respective players from the current positions, and acquires a flight path that avoids no-fly zones based on the estimation result before the departure of the unmanned aerial vehicle 20 as an example.

The unmanned aerial vehicle control system 1 of Modification Example (3) of the present invention includes the movement estimation module 108. The controller 11 mainly implements the movement estimation module 108. The movement estimation module 108 is configured to estimate the movement of the player from the current position based on the moving object position information. The movement estimation module 108 may estimate a position of the player at one time point in the future, or may chronologically estimate positions of the player at a plurality of time points in the future. Description is now made of a case in which the movement estimation module 108 chronologically estimates the movement of the player.

A relationship between the moving object position information and the position of the player at respective time points in the future may be described in a program, or may be stored in a form of a numerical expression or in a form of a table in the data storage 100 in advance. This relationship may be considered also as a definition of a relationship between the current position and the future position of the player. For example, in this relationship, a relationship between the current position and a position "n" minutes later ("n" is any numerical value) of the player may be defined. The position in the future is only required to be defined in accordance of a progress of a standard play in the golf course.

The zone setting module 103 sets a no-fly zone based on the estimation result obtained by the movement estimation module 108. The zone setting module 103 is configured to set the no-fly zone based on the positions of the players at respective time points in the future estimated by the movement estimation module 108. The method of setting the no-fly zone at the respective time points may be the same as the methods described in the embodiment and the above-mentioned modification examples. That is, the zone setting module 103 is only required to set the no-fly zone at each of the time points subsequent to the current time point in the same manner as the method described in the embodiment.

Figure 18:
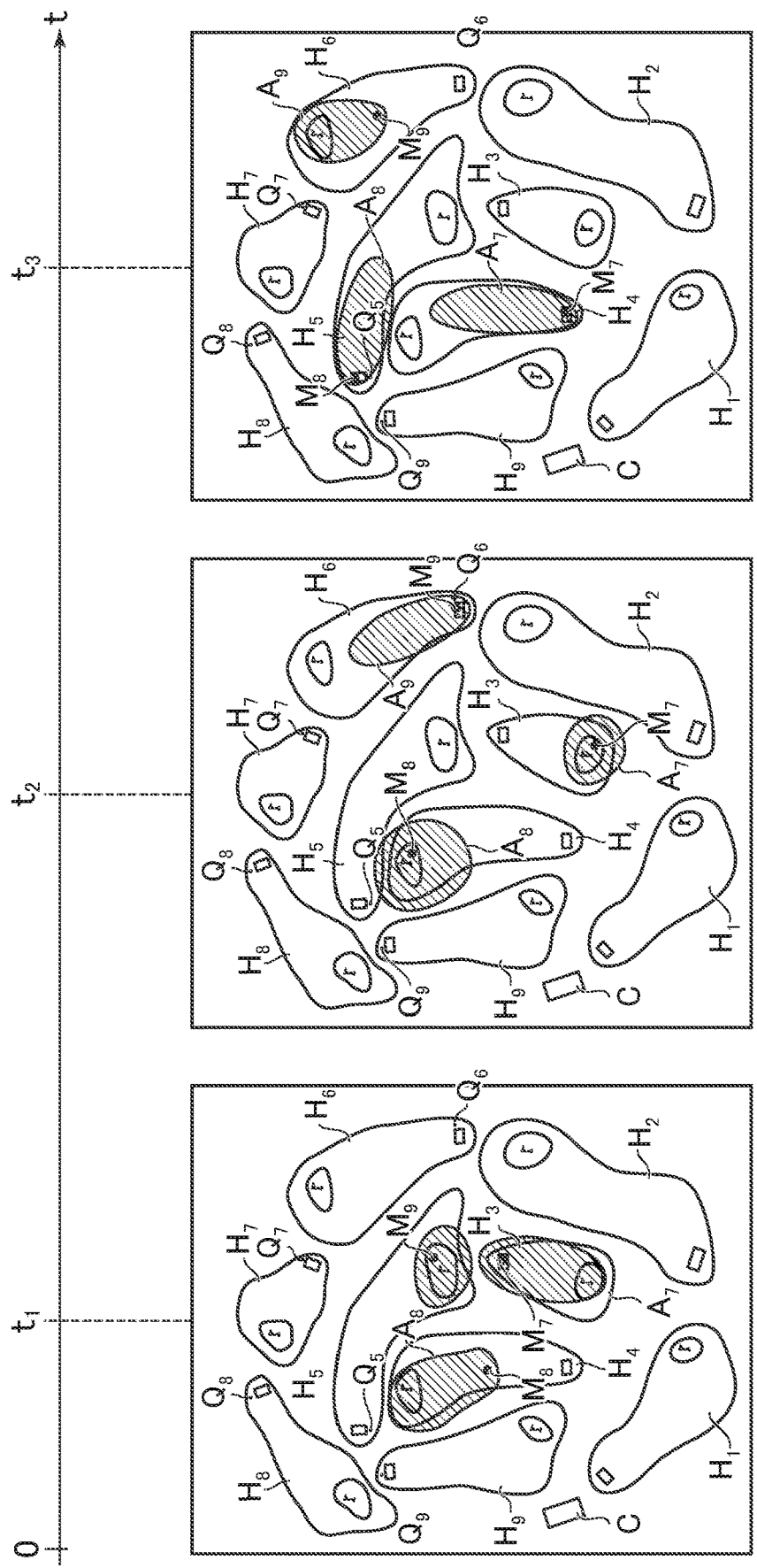
FIG. 18 is a diagram for illustrating how no-fly zones are set in Modification Example (3) of the present invention.

FIG. 18 is a diagram for illustrating how no-fly zones are set in Modification Example (3). A "t" axis illustrated in FIG. 18 is a time axis. On this occasion, as illustrated in FIG. 18, three groups of players in the round exist. Positions indicated by the moving object position information of the respective groups are indicated by reference numerals $M_7$ to $M_9$. The position $M_7$ at a certain time point $t_1$ indicates players playing in the third hole $H_3$. The position $M_8$ indicates players playing in the fourth hole $H_4$. The position $M_9$ indicates players playing in the fifth hole $H_5$.

For example, the player hits a shot so that the ball gets close to the pin, and plays sequentially in the respective holes. Therefore, it is assumed that the future position of the player is defined to be a position closer to the pin with respect to the current position or a position in a subsequent hole in the order of the holes. Therefore, the positions $M_7$ to $M_9$ at a time point $t_2$ later than the time point $t_1$ have moved toward the pins or to the next hole with respect to the positions $M_7$ to $M_9$ at the time point $t_1$. Similarly, the positions $M_7$ to $M_9$ at a time point $t_3$ later than the time point $t_2$ have moved toward the pin or to the next holes with respect to the positions $M_7$ to $M_9$ at the time point $t_2$.

In Modification Example (3), the chronological movement is estimated as illustrated in FIG. 18. Therefore, the zone setting module 103 is configured to set no-fly zones at the respective time points estimated by the movement estimation module 108. That is, the zone setting module 103 estimates chronological changes in no-fly zones based on the chronological changes in positions of the players, and the flight controller 105 controls the flight of the unmanned aerial vehicle based on the chronological changes in no-fly zones.

For example, in the movement estimation example as illustrated in FIG. 18, when the unmanned aerial vehicle 20 flies from a position P to a pickup point $Q_6$, and tries to fly close to the third hole $H_3$ to the fifth hole $H_5$ at the time point $t_1$, the no-fly zones $A_7$ to $A_9$ are concentrated, and the unmanned aerial vehicle 20 is required to make a large detour. Therefore, the flight controller 105 may acquire a flight path along which the unmanned aerial vehicle 20 delays the departure, or waits during the flight so as to fly through the third hole $H_3$ to the fifth hole $H_5$ at the time point $t_2$ or $t_3$.

With Modification Example (3), the movements of the players from the current positions are estimated, and the unmanned aerial vehicle 20 can be caused to fly so as to avoid the no-fly zones based on the estimation result. Therefore, the unmanned aerial vehicle 20 can be caused to fly so as to more reliably avoid the no-fly zones. A frequency of obtaining the moving object position information can be reduced by estimating positions of the players, and a communication amount can thus be reduced.

Moreover, when no-fly zones are chronologically set based on the movement estimation of the players, optimal no-fly zones can be set based on the detailed movement estimation corresponding to the respective time points.

(4) Moreover, for example, the unmanned aerial vehicle control system 1 may be configured to determine the flight path in consideration of an arrival time and a movement distance. On this occasion, whether priority is given to the arrival time or the movement distance to fly the unmanned aerial vehicle 20 may be specified by a player, the administrator, or the like.

The unmanned aerial vehicle control system 1 of Modification Example (4) of the present invention includes the information acquisition module 109 and the specification reception module 110. The controller 11 mainly implements those modules. The information acquisition module 109 is configured to acquire time information on the arrival time and distance information on the movement distance at a time when the unmanned aerial vehicle flies to the destination by avoiding the no-fly zones. The flight controller 105 may be configured to acquire a plurality of candidates of the flight path. In this case, the information acquisition module 109 may be configured to acquire the time information and the distance information for each of the candidates of the flight path. As the candidates of the flight path, the shortest path between the takeoff and landing point and the pickup point based on the path search algorithm and paths each different in distance from the shortest path by less than a threshold value is only required to be acquired.

The information acquisition module 109 is configured to acquire the time information and the distance information based on the flight path acquired by the flight controller 105. For example, the information acquisition module 109 calculates a total flight distance based on the latitude/longitude information on the flight path, to thereby acquire the distance information. Moreover, for example, the information acquisition module 109 divides the total flight distance of the flight path by a predetermined flight speed, to thereby acquire the time information. The flight speed is a standard speed of the unmanned aerial vehicle 20, and may be a numerical value specified in advance.

The specification reception module 110 is configured to receive a specification relating to whether priority is given to the arrival time or the movement distance. For example, the specification reception module 110 is configured to receive the specification based on an input from the operation device 14 or the operation device 34.

The flight controller 105 is configured to carry out the flight control of the unmanned aerial vehicle 20 based on the time information and the distance information. For example, the flight controller 105 is configured to carry out the flight control for the unmanned aerial vehicle 20 based on the specification result received by the specification reception module 110. When the specification of giving priority to the arrival time is received, the flight controller 105 carries out the flight control for the unmanned aerial vehicle 20 based on the flight path having the earliest arrival time. On the other hand, when the specification of giving priority to the movement distance is received, the flight controller 105 carries out the flight control for the unmanned aerial vehicle 20 based on the flight path having the shortest movement distance.

With Modification Example (4), the unmanned aerial vehicle 20 can be caused to fly based on the flight path reflecting the arrival time or the movement distance. Therefore, the unmanned aerial vehicle 20 can be caused to fly without waste.

Moreover, the unmanned aerial vehicle 20 can be caused to fly while priority is given to the arrival time, or the unmanned aerial vehicle 20 can be caused to fly while priority is given to the movement distance. Therefore, for example, the unmanned aerial vehicle 20 can be caused to fly along the flight path that depends on the player or the administrator.

The method of the flight control by the flight controller 105 based on the time information and the distance information is not limited to that of the above-mentioned examples, and the specification of whether priority is given to the arrival time or the travel period may not be required. For example, the flight controller 105 may be configured to acquire a predetermined evaluation value based on the time information and the distance information, to thereby determine a flight path based on the evaluation value. The evaluation value may indicate a cost in terms of the time, distance, and the consumed energy. For example, a numerical expression for calculating the evaluation value is only required to be defined. This numerical expression may have the time information and the distance information as variables, and the time information and the distance information may be weighted differently from each other. The flight controller 105 may be configured to acquire a flight path that minimizes the cost indicated by the evaluation value.

(5) Moreover, for example, even when a current flight path crosses a no-fly zone, movement of players may result in a possibility that, a portion from which the players have moved is no longer contained in the no-fly zone. Therefore, the flight controller 105 may be configured to cause the unmanned aerial vehicle 20 to wait, to thereby control the flight of the unmanned aerial vehicle 20 to avoid the no-fly zone.

Description is now made of a case in which a no-fly zone of a hole which the unmanned aerial vehicle 20 has approached is avoided as described in the embodiment. For example, the flight controller 105 determines whether or not the current flight path avoids the no-fly zone. When the flight controller 105 determines that the current flight path does not avoid the no-fly zone, the flight controller 105 causes the unmanned aerial vehicle 20 to wait immediately before the no-fly zone. The term "immediately before" means a place within a predetermined distance from the no-fly zone.

When the administrator terminal 10 implements the flight controller 105, the flight controller 105 transmits a predetermined wait instruction to the unmanned aerial vehicle 20. The wait instruction is only required to be transmitted in a predetermined data format. The term "waiting" corresponds to a state in which the unmanned aerial vehicle 20 hovers on the spot, lands on the ground, or stays while flying around in a certain range (for example, a region having a radius equal to or less than 5 meters).

The moving object position acquisition module 102 repeatedly acquires the moving object position information while the unmanned aerial vehicle 20 is waiting. The zone setting module 103 sets a no-fly zone each time the moving object position information is acquired. The flight controller 105 compares the latest no-fly zone and the flight path with each other, to thereby determine whether the flight path avoids the latest no-fly zone. When the flight controller 105 determines that the flight path does not avoid the latest no-fly zone, the flight controller 105 causes the unmanned aerial vehicle 20 to continue to wait. When the flight controller 105 determines that the flight path avoids the latest no-fly zone, the flight controller 105 transmits a predetermined flight resumption instruction to the unmanned aerial vehicle 20. The flight resumption instruction is only required to be transmitted in a predetermined data format. When the unmanned aerial vehicle 20 receives the flight resumption instruction, the unmanned aerial vehicle 20 finishes the waiting, and starts the flight along the flight path.

With Modification Example (5) of the present invention, the unmanned aerial vehicle 20 can be prevented from wastefully making a detour. As a result, the arrival of the unmanned aerial vehicle 20 at the destination can be advanced, and the power consumption of the unmanned aerial vehicle 20 can be reduced.

The unmanned aerial vehicle 20 may not be caused to wait immediately before the no-fly zone. For example, as in Modification Example (3), when a no-fly zone is estimated in advance, the unmanned aerial vehicle 20 may be caused to wait at the takeoff and landing point, to thereby delay the departure. Moreover, for example, with the same method as that of Modification Example (3), the travel estimation module 108 may be caused to estimate a change in no-fly zone during flight of the unmanned aerial vehicle 20. The flight controller 105 may determine whether or not to cause the unmanned aerial vehicle 20 to wait based on an arrival time or a movement distance in a case in which the unmanned aerial vehicle 20 is caused to fly along a new flight path as described in the embodiment and an arrival time or a movement distance in a case in which the unmanned aerial vehicle 20 is caused to wait and to fly along the current flight path. In this case, the arrival times and the movement distances are only required to be acquired through the same method as that of Modification Example (4). The flight controller 105 may cause the unmanned aerial vehicle 20 to wait when the arrival time is earlier when the unmanned aerial vehicle 20 waits and flies along the current flight path than when the unmanned aerial vehicle 20 flies along the new flight path. The flight controller 105 may cause the unmanned aerial vehicle 20 to wait when the movement distance is shorter in a case in which the unmanned aerial vehicle 20 waits and flies along the current flight path than in a case in which the unmanned aerial vehicle 20 flies along the new flight path. The flight controller 105 is only required to determine whether or not to cause the unmanned aerial vehicle 20 to wait in accordance with whether priority is given to the arrival time or the movement distance.

(6) Moreover, for example, two or more of Modification Examples (1) to (5) may be combined.

Moreover, for example, the moving object terminal 30 may be a golf cart terminal placed in a golf cart. In this case, the moving object is the golf cart. The golf cart terminal may be, for example, a terminal for guiding the player in details of the hole. The moving object position acquisition module 102 may be configured to acquire the moving object position information on the current position of the golf cart based on the detection signal of the GPS sensor 36 of the moving object terminal 30, which is the golf cart terminal. The zone setting module 103 is to set a no-fly zone based on the current position of the golf cart. The flight controller 105 causes the unmanned aerial vehicle 20 to fly so as to avoid the no-fly zone set based on the current position of the golf cart.

Moreover, for example, description is made of the case in which the unmanned aerial vehicle 20 carries a package as an example, but the unmanned aerial vehicle control system 1 may be applied to a scene in which the unmanned aerial vehicle 20 flies over a traveling moving object. For example, the unmanned aerial vehicle control system 1 may also be applied to a case in which the unmanned aerial vehicle 20 uses the camera 24A to take an image of a state of a predetermined place and provide information.

Moreover, for example, description is made of the case in which the administrator terminal 10, the unmanned aerial vehicle 20, and the moving object terminal 30 are included in the unmanned aerial vehicle control system 1, but the unmanned aerial vehicle control system 1 is only required to include at least one computer, and may include other computers. For example, when the unmanned aerial vehicle 20 is configured to detect the moving object position information, the moving object terminal 30 may not be included in the unmanned aerial vehicle control system 1. Further, when the unmanned aerial vehicle 20 has the functions of the administrator terminal 10, the administrator terminal 10 may not be included in the unmanned aerial vehicle control system 1.

Moreover, for example, the above-mentioned respective functions are only required to be implemented in any one of the computers of the unmanned aerial vehicle control system 1. The functions described as implemented in the administrator terminal 10 may be implemented in the unmanned aerial vehicle 20, the moving object terminal 30, or other computers. For example, the unmanned aerial vehicle 20 may implement the data storage 100. Moreover, for example, when the unmanned aerial vehicle 20 implements the moving object position acquisition module 102, the unmanned aerial vehicle 20 may directly acquire the moving object position information from the moving object terminal 30, or may acquire the moving object position information based on detection details of the own sensor group 24. Moreover, for example, when the unmanned aerial vehicle 20 implements the zone setting module 103, the unmanned aerial vehicle 20 may set a no-fly zone based on the map data. Moreover, when the unmanned aerial vehicle 20 implements the flight controller 105, the unmanned aerial vehicle 20 may determine the flight path by itself, and may control the number of rotations of the propellers, to thereby control the flight. Further, the above-mentioned functions other than the moving object position acquisition module 102, the zone setting module 103, and the flight controller 105 may be omitted.

The invention claimed is:

1. An unmanned aerial vehicle control system, comprising at least one processor configured to:
   acquire moving object position information on a current position of a moving object moving above a surface of an earth;
   set a no-fly zone in which a flight of the unmanned aerial vehicle is inhibited based on the moving object position information, wherein the no-fly zone changes in accordance with movements of the moving object; and
   control the flight of the unmanned aerial vehicle so that the unmanned aerial vehicle avoids the no-fly zone.

2. The unmanned aerial vehicle control system according to claim 1, wherein the at least one processor acquires the moving object position information based on a signal from a satellite, the signal being received by a moving terminal that moves with the moving object.

3. The unmanned aerial vehicle control system according to claim 1, wherein the at least one processor sets the no-fly zone based on relationship information on a relationship between each of predetermined positions on the earth and at least one of a size and a shape of the no-fly zone.

4. The unmanned aerial vehicle control system according to claim 1, wherein the at least one processor controls the flight based on time information on an arrival time when the unmanned aerial vehicle flies to a destination by avoiding the no-fly zone.

5. The unmanned aerial vehicle control system according to claim 1, wherein the at least one processor sets the no-fly zone based on movement state information indicating whether or not the moving object is moving.

6. The unmanned aerial vehicle control system according to claim 1, wherein the at least one processor sets the no-fly zone based on first moving object property information indicating whether the moving object is a human or a vehicle, or second moving object property information on a type of the moving object that is the vehicle.

7. The unmanned aerial vehicle control system according to claim 1, wherein when the moving object moves, at least one of a size and a shape of the no fly zone changes.

8. The unmanned aerial vehicle control system according to claim 1, wherein when the no fly zone moves based on the movements of the moving object.

9. The unmanned aerial vehicle control system according to claim 1, wherein the at least one processor:
   acquires unmanned aerial vehicle position information on a current position of the unmanned aerial vehicle;
   acquires destination information on a destination of the unmanned aerial vehicle; and
   controls the flight of the unmanned aerial vehicle so that the unmanned aerial vehicle arrives at the destination from the current position of the unmanned aerial vehicle by avoiding the no-flight zone based on the unmanned aerial vehicle position information and the destination information.

10. The unmanned aerial vehicle control system according to claim 1, wherein the at least one processor acquires moving object state information on a current state of the moving object, and
   sets the no-fly zone based on the moving object state information.

11. The unmanned aerial vehicle control system according to claim 1, wherein the at least one processor estimates a movement of the moving object from the current position based on the moving object position information, and
sets the no-fly zone based on an estimation result.

12. The unmanned aerial vehicle control system according to claim 11,
wherein the at least one processor chronologically estimates the movement of the moving object,
sets the no-fly zone for each time point, and
carries out flight control for the unmanned aerial vehicle based on a chronological change in the no-fly zone.

13. The unmanned aerial vehicle control system according to claim 1, wherein the at least one processor receives a specification relating to whether priority is to be given to the arrival time or the movement distance, and
carries out the flight control for the unmanned aerial vehicle based on a specification result.

14. The unmanned aerial vehicle control system according to claim 1, wherein the at least one processor causes the unmanned aerial vehicle to wait so that the flight of the unmanned aerial vehicle is controlled to avoid the no-fly zone.

15. The unmanned aerial vehicle control system according to claim 1,
wherein the moving object is a player or a golf cart moving in a golf course,
wherein the at least one processor acquires the moving object position information indicating a current position of the player or the golf cart based on a detection signal of a GPS sensor of a player terminal or a golf cart terminal,
sets the no-fly zone based on the current position of the player or the golf cart, and
controls the flight of the unmanned aerial vehicle carrying a package to be transported to a predetermined position in the golf course so that the unmanned aerial vehicle avoids the no-fly zone set based on the current position of the player or the golf cart.

16. The unmanned aerial vehicle control system according to claim 1, wherein the no-fly zone contains the position of the moving object.

17. An unmanned aerial vehicle control method, comprising:
acquiring moving object position information on a current position of a moving object moving above a surface of an earth;
setting a no-fly zone in which a flight of the unmanned aerial vehicle is inhibited based on the moving object position information, wherein the no-fly zone changes in accordance with movements of the moving object; and
controlling the flight of the unmanned aerial vehicle so that the unmanned aerial vehicle avoids the no-fly zone.

18. A non-transitory computer-readable information storage medium for storing a program for causing a computer to:
acquire moving object position information on a current position of a moving object moving above a surface of an earth;
set a no-fly zone in which a flight of the unmanned aerial vehicle is inhibited based on the moving object position information, wherein the no-fly zone changes in accordance with movements of the moving object; and
control the flight of the unmanned aerial vehicle so that the unmanned aerial vehicle avoids the no-fly zone.

* * * * *